(12) United States Patent
Katsuragi

(10) Patent No.: US 10,596,823 B2
(45) Date of Patent: *Mar. 24, 2020

(54) INK SET, WHITE INK, RECORDING METHOD, AND INK DISCHARGING DEVICE

(71) Applicant: RICOH COMPANY, LTD., Tokyo (JP)

(72) Inventor: Koji Katsuragi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,790

(22) Filed: Sep. 18, 2018

(65) Prior Publication Data

US 2019/0105919 A1 Apr. 11, 2019

(30) Foreign Application Priority Data

Oct. 6, 2017 (JP) .................................. 2017-195971
Jul. 17, 2018 (JP) .................................. 2018-134060

(51) Int. Cl.
*C09D 11/033* (2014.01)
*C09D 11/10* (2014.01)
(Continued)

(52) U.S. Cl.
CPC ........... *B41J 2/2114* (2013.01); *C09D 11/033* (2013.01); *C09D 11/10* (2013.01); *C09D 11/12* (2013.01);
(Continued)

(58) Field of Classification Search
None
See application file for complete search history.

(56) References Cited

U.S. PATENT DOCUMENTS

| 4,880,465 A | * | 11/1989 | Loria | ...................... | C09D 11/30 106/31.13 |
| 6,398,862 B1 | * | 6/2002 | Hechler | ................... | C08K 9/02 106/401 |

(Continued)

FOREIGN PATENT DOCUMENTS

| JP | 2012-025885 | 2/2012 |
| JP | 2015-131964 | 7/2015 |

(Continued)

OTHER PUBLICATIONS

English translation of JP 2018/080313, May 24, 2018; 42 pages.*
(Continued)

*Primary Examiner* — Helene Klemanski
(74) *Attorney, Agent, or Firm* — Oblon, McClelland, Maier & Neustadt, L.L.P.

(57) ABSTRACT

An ink set includes a white ink including a hollow particle accounting for 5.0 to 25.0 percent by mass of the white ink and a non-white ink, wherein, in an infrared spectrum for a dried film of the white ink, a ratio (Y/X) of the maximum value Y in an absorption band of from 1720 to 1740 $cm^{-1}$ to the maximum value X in an absorption band of from 1590 to 1610 $cm^{-1}$, is from 3.0 to 6.0, wherein the non-white ink has a surface tension of from 20.0 to 30.0 mN/m at a bubble lifetime of 1500 ms.

16 Claims, 9 Drawing Sheets

(51) Int. Cl.
*C09D 11/12* (2006.01)
*C09D 11/32* (2014.01)
*C09D 11/40* (2014.01)
*C08K 7/24* (2006.01)
*C08K 7/26* (2006.01)
*B41J 2/21* (2006.01)
*B41M 7/00* (2006.01)
*B41J 2/165* (2006.01)

(52) U.S. Cl.
CPC .............. *C09D 11/32* (2013.01); *C09D 11/40* (2013.01); *B41J 2/16517* (2013.01); *B41J 2/2117* (2013.01)

(56) References Cited

U.S. PATENT DOCUMENTS

| | | | | |
|---|---|---|---|---|
| 9,803,093 | B2* | 10/2017 | Katsuragi | B41J 2/14016 |
| 10,150,880 | B2* | 12/2018 | Katsuragi | B41J 2/01 |
| 10,316,205 | B2* | 6/2019 | Katsuragi | C09D 11/107 |
| 2009/0182098 | A1* | 7/2009 | Sano | B41M 5/0023 |
| | | | | 525/453 |
| 2009/0220695 | A1* | 9/2009 | Oyanagi | B41J 2/2114 |
| | | | | 427/256 |
| 2011/0318510 | A1* | 12/2011 | Seguchi | B41M 5/506 |
| | | | | 428/32.33 |
| 2012/0006224 | A1* | 1/2012 | Oyanagi | C09D 11/36 |
| | | | | 106/31.65 |
| 2016/0152845 | A1* | 6/2016 | Okada | C09D 11/32 |
| | | | | 347/86 |
| 2016/0177116 | A1 | 6/2016 | Katsuragi et al. | |
| 2017/0166764 | A1* | 6/2017 | Katsuragi | B41J 2/14016 |
| 2017/0267889 | A1* | 9/2017 | Katsuragi | B41J 2/01 |
| 2017/0313896 | A1 | 11/2017 | Katsuragi | |
| 2018/0001669 | A1* | 1/2018 | Furukawa | B41J 11/002 |
| 2018/0094150 | A1* | 4/2018 | Katsuragi | C09D 11/106 |

FOREIGN PATENT DOCUMENTS

| | | |
|---|---|---|
| JP | 2016-108527 | 6/2016 |
| JP | 2018-080313 | 5/2018 |

OTHER PUBLICATIONS

English translation of JP 2012/025885, Feb. 2012; 22 pages.*
English translation of JP 2015/131964, Jul. 2015; 21 pages.*
U.S. Appl. No. 15/913,959, filed Mar. 7, 2018, Atsufumi Hanazawa, et al.

* cited by examiner

INK SET, WHITE INK, RECORDING METHOD, AND INK DISCHARGING DEVICE

CROSS-REFERENCE TO RELATED APPLICATIONS

This patent application is based on and claims priority pursuant to 35 U.S.C. § 119 to Japanese Patent Application Nos. 2017-195971 and 2018-134060, filed on Oct. 6, 2017 and Jul. 17, 2018, respectively, in the Japan Patent Office, the entire disclosures of which are hereby incorporated by reference herein.

BACKGROUND

Technical Field

The present invention relates to an ink set, a white ink, and a recording method, and an ink discharging device.

Description of the Related Art

Typically, in order to represent whiteness on a transparent recording medium or color a colored recording medium with color ink, in terms of enhancement on representation of whiteness on the transparent recording medium or coloring property of the color ink on the colored recording medium, white ink containing a hollow resin particle having a light specific gravity to make sedimentation slow is used to sufficiently conceal transparency of the transparent recording medium and the color of the colored recording medium.

SUMMARY

According to the present invention, provided is an improved ink set which includes a white ink including a hollow particle accounting for 5.0 to 25.0 percent by mass of the white ink and a non-white ink, wherein, in an infrared spectrum for a dried film of the white ink, a ratio (Y/X) of the maximum value Y in an absorption band of from 1720 to 1740 cm$^{-1}$ to the maximum value X in an absorption band of from 1590 to 1610 cm$^{-1}$, is from 3.0 to 6.0, wherein the non-white ink has a surface tension of from 20.0 to 30.0 mN/m at a bubble lifetime of 1500 ms.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
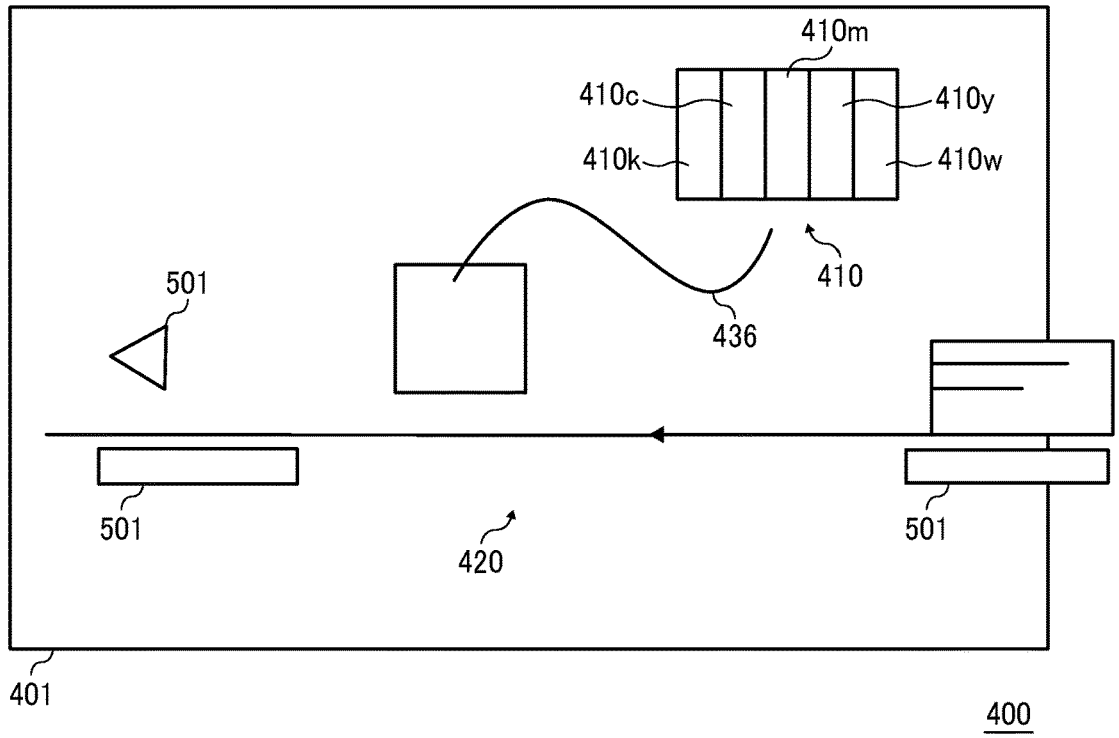
FIG. 1 is a diagram illustrating an example of the ink discharging device using the ink set of an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

An ink set to provide an image having excellent fixability has been proposed which is an ink containing a pigment and a polymer containing a copolymer of styrene and acrylic and a white ink containing a hollow particle while the difference between the refractive index of the polymer and the refractive index of the hollow particle is 0.1 or less, and another ink set to provide an image having excellent fixability has been proposed which is an ink containing a self-dispersible pigment and a polymer and a white ink containing a hollow particle while the difference between the refractive index of the polymer and the refractive index of the hollow particle is 0.1 or less.

Printing with an ink set of a white ink having a hollow particle and a non-white ink causes a problem that a water-soluble organic solvent in the non-white ink dissolves the resin of the hollow particle of the white ink, so that the color becomes non-white as a result.

The present disclosure is to provide an ink set of a white ink and a non-white ink capable of producing images having white solid portions with high lightness, good wettability of the non-white ink to the white ink, and good filling in the solid portions.

Embodiments of the present disclosure are, for example, as follows.

1. The ink set includes a white ink including a hollow particle accounting for 5.0 to 25.0 percent by mass of the white ink and a non-white ink, wherein, in an infrared (IR) spectrum for a dried film of the white ink, the ratio (Y/X) of a maximum value Y in an absorption band of from 1720 to 1740 $cm^{-1}$ to the maximum value X in an absorption band of from 1590 to 1610 $cm^{-1}$, is from 3.0 to 6.0, wherein the non-white ink has a surface tension of from 20.0 to 30.0 mN/m at a bubble lifetime of 1500 ms.

The present disclosure relates to the ink set of the above-mentioned 1 and also includes the following 2 to 15 as embodiments 2. The ink set according to 1 mentioned above, wherein the average of a supernatant relative change amount percentage in an integration of backscattered light intensity peaks of the white ink is −2.0 percent or more as measured by Turbi Scan Classic MA 2000, manufactured by EKO Seiki Co., Ltd., after the white inks is stored at 25 degrees C. for 168 hours.

3. The ink set according to 1 or 2 mentioned above, wherein the white ink further contains polyethylene wax, carnauba wax, or a polydimethylsiloxane compound.

4. The ink set according to any one of 1 to 3 mentioned above, wherein the contact angle of the non-white ink to the dried film of the white ink based on a drop method is from 15.0° to 30.0°.

5. The ink set according to any one of 1 to 4, wherein the ratio (A/B) of a surface tension value A of the non-white ink at a bubble lifetime of 15 ms to a surface tension value B of the non-white ink at a bubble lifetime of 1500 ms is 1.20 to 1.50.

6. The ink set according to any one of 1 to 5 mentioned above, wherein the non-white ink contains an organic solvent having a mixing SP value of from 11.5 to 15.5 $[cal/cm^3]^{0.5}$.

7. The ink set according to any one of 1 to 6 mentioned above, wherein the non-white ink contains a resin having a mixing SP value of from 7.5 to 10.0 $[cal/cm^3]^{0.5}$.

8. A white ink includes a hollow particle accounting for 5.0 to 25.0 percent by mass of the white ink, wherein, in an infrared spectrum for a dried film of the white ink, the ratio (Y/X) of a maximum value Y in an absorption band of from 1720 to 1740 $cm^{-1}$ to the maximum value X in an absorption band of from 1590 to 1610 $cm^{-1}$, is from 3.0 to 6.0.

9. The white ink according to 8 mentioned above, wherein the average of a supernatant relative change amount percentage in an integration of backscattered light intensity peaks of the white ink is −2.0 percent or more as measured by Turbi Scan Classic MA 2000, manufactured by EKO Seiki Co., Ltd., after the white inks is stored at 25 degrees C. for 168 hours.

10. The white ink according to 8 or 9 mentioned above, wherein the white ink further contains polyethylene wax, carnauba wax, or a polydimethylsiloxane compound.

11. A recording method includes applying the white ink of the ink set of any one of 1 to 7 to a recording medium and applying the non-white ink of the ink set of any one of 1 to 7 to the recording medium.

12. The recording method according to 11 mentioned above, wherein the non-white ink is applied after the white ink is applied.

13. The recording method according to 11 or 12 mentioned above, wherein the white ink is dried after the white ink is applied.

14. An ink discharging device includes the ink set of any one of 1 to 7 mentioned above and an ink discharging head including a nozzle to discharge the white ink and the non-white ink of the ink set.

15. The ink discharging device according to 14 mentioned above, wherein the ink discharging head further includes a plurality of individual liquid chambers communicating with the nozzle, an inflow channel to allow the ink to flow into the individual liquid chambers, and an outflow channel to allow the ink to flow out of the individual liquid chambers, wherein the ink discharging device further includes a circulation channel to allow and circulate the ink to flow out of the outflow channel into the inflow channel, and a negative pressure generating device to generate a negative pressure to allow the ink out of individual liquid chambers.

Ink Set

The ink set of the present disclosure includes a white ink including a hollow particle accounting for 5.0 to 25.0 percent by mass of the white ink; and a non-white ink, wherein, in an infrared spectrum for a dried film of the white ink, the ratio (Y/X) of the maximum value Y in an absorption band of from 1720 to 1740 $cm^{-1}$ to the maximum value X in an absorption band of from 1590 to 1610 $cm^{-1}$, is from 3.0 to 6.0, wherein the non-white ink has a surface tension of from 20.0 to 30.0 mN/m at a bubble lifetime of 1500 ms.

The non-white ink includes, for example, black ink, cyan ink, yellow ink, magenta ink, metallic ink, and clear ink. To make an ink set using several kinds of these non-white inks, all of the non-white inks needs to have a surface tension of from 20.0 to 30.0 mN/m at a bubble lifetime of 1500 ms.

When the non-white ink is discharged onto the white ink including hollow particles having large particle diameters, ink dots do not spread if wettability of the non-white ink is low so that an image in which a solid portion is not suitably filled is obtained. In addition, if wettability of the non-white ink is increased, a component in the non-white ink dissolves a resin in the hollow particle, thereby preventing demonstration of white.

In the present disclosure, the surface tension of the non-white ink at a bubble lifetime of 1500 ms is set to be from 20.0 to 30.0 mN/m. Also, the white ink contains hollow particles accounting for 5.0 to 25.0 percent by mass of the white ink, and in an infrared spectrum for a dried film of the white ink, the ratio (Y/X) of the maximum value Y in an absorption band of from 1720 to 1740 $cm^{-1}$ to the maximum value X in an absorption band of from 1590 to 1610 $cm^{-1}$ is set to be from 3.0 to 6.0. This makes it possible to reduce the dissolution of a resin of the hollow particle in the white ink by the non-white ink while wettability of the non-white ink to the white ink is increased at the same time.

White Ink

The white ink of the present disclosure contains hollow particles and optionally an organic solvent, water, a resin, a lubricant, an additive, and a coloring material used in combination with hollow particles.

The white ink of the present disclosure contains a hollow particle accounting for 5.0 to 25.0 percent by mass of the white ink, and in the IR spectrum of the dried film of the white ink, the ratio (Y/X) of the maximum value Y in the absorption band of from 1720 to 1740 $cm^{-1}$ to the maximum value X in an absorption band of from 1590 to 1610 $cm^{-1}$ is from 3.0 to 6.0.

In the IR spectrum of the dried film of the white ink, to set the ratio (Y/X) of the maximum value Y in the absorption band of from 1720 to 1740 $cm^{-1}$ to the maximum value X in the absorption band of from 1590 to 1610 $cm^{-1}$ to 3.0 to 6.0, for example, it is suitable to add hollow particles having a ratio (Y/X) of the maximum value Y in the absorption band of from 1720 to 1740 cm$^{-1}$ to the maximum value X in the absorption band of from 1590 to 1610 cm$^{-1}$ of from 3.0 to 6.0.

The IR spectrum is measured according to Attenuated Total Reflection method (ATR method), and the maximum value X in the absorption band of from 1590 to 1610 cm$^{-1}$, the maximum value Y in the absorption band of from 1720 to 1740 cm$^{-1}$ are the value of absorbance.

The dry film of the white ink for use in measuring the IR spectrum is prepared in the following conditions. In addition, the dried film of the white ink used to obtain the contact angle of the non-white ink in a drop method described later is also prepared in the same manner.

Two grams of the white ink is weighed in a flat petri dish having an inner diameter of 33 mm, which is left to rest for 60 seconds in a thermostatic chamber (PDR-3J, manufactured by ESPEC Co., Ltd.) set at 90 degrees C. to prepare a dry film.

The hollow particle has a shell formed of a resin.

The white ink described here includes not only those containing only hollow particles as coloring materials but also those which additionally contain other coloring materials in addition to hollow particles.

Hollow Particle

The hollow particles for use in the present disclosure have a hollow inner layer and an outer layer formed of a resin, and the outer diameter thereof is preferably from 0.1 to 1 μm, and the inner diameter is preferably from 0.04 to 0.8 μm.

Since the inner layer is hollow, specific gravity of the hollow particles against the white ink is about 1 so that, unlike titanium dioxide, the white ink does not settle out over time. In order to avoid sedimentation over time, it is preferable that the thickness of the resin of the hollow particle be 10 to 20 percent to the size of the entire hollow resin particle.

The hollow particle for use in the present disclosure preferably contains a copolymer having a structure unit represented by the following Chemical formula 1 and a structure unit represented by the following Chemical formula 2 and, in the IR spectrum of a dry film of the white ink, the ratio (Y/X) of the maximum value Y in the absorption band of from 1720 to 1740 cm$^{-1}$ to the maximum value X in the absorption band of 1590 to 1610 cm$^{-1}$ is from 3.0 to 6.0 and preferably from 3.0 to 5.5 to enhance lightness and strength of the hollow particle.

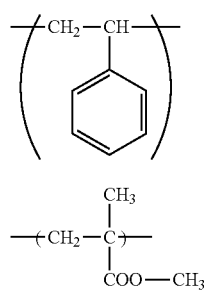

Chemical Formula 1

Chemical Formula 2

The structure unit of Chemical formula 1 mainly helps to enhance the lightness and the structure unit of Chemical formula 2 mainly helps to enhance the strength of the hollow particle. The ratio of Chemical formula 1 to Chemical formula 2 of the hollow particle containing the copolymer in the white ink is almost identical to the ratio of the Chemical formula 1 to Chemical formula 2 in the copolymer contained in the white ink. IR spectrum of the hollow particles is used for calculation of the ratio. The ratio (Y/X) of the maximum value Y in the absorption band of from 1720 to 1740 cm$^{-1}$ derived from carbonyl stretching vibration of Chemical formula 2 to the maximum value X of the absorption band of from 1590 to 1610 cm$^{-1}$ derived from C=C stretching vibration of the aromatic series represented by Chemical formula 1 is from 3.0 to 6.0 in the present disclosure. When the ratio (Y/X) is 3.0 or greater, the strength of the hollow resin can be enhanced, which consequently makes it possible to reduce degradation of lightness ascribable to dissolution of the resin of the hollow particles caused by energy such as heat. Conversely, when the ratio (Y/X) is 6.0 or less, lightness of the hollow particles increases and additionally sedimentation properties of the hollow particles can be improved. IR spectrum of the hollow particles is used for calculation of the ratio. Also, the ratio (Y/X) of the maximum value Y in the absorption band of from 1720 to 1740 cm$^{-1}$ derived from carbonyl stretching vibration of Chemical formula 2 to the maximum value X of the absorption band of from 1590 to 1610 cm$^{-1}$ derived from C=C stretching vibration of the aromatic series represented by Chemical formula 1 in the hollow particle is preferably from 3.0 to 6.0 in the present disclosure.

In the present disclosure, it is preferable that the average particle diameter of the hollow particles be from 400 to 600 nm. If the average particle diameter is 400 nm or greater, it is possible to secure lightness for a recording medium such as high quality paper. When the average particle diameter is 600 nm or less, sedimentation property and discharging stability can be improved. The average particle diameter means the particle diameter at 50 percent of the accumulated curve which is obtained as the entire volume of a group is defined as 100 percent.

The content of the hollow particles in the white ink is set to 5.0 to 25.0 percent by mass. If the content is 5.0 percent by mass or greater, it is possible to secure film thickness of the white ink for a recording such as high quality paper. Conversely, when the content is 25.0 percent by mass or less, sedimentation property and discharging stability can be improved. The content of the hollow particle in the white ink is preferably from 5.0 to 20.0 percent by mass.

When preparing printed matter using the white ink of the present disclosure, the thickness of the ink film forming the printing layer is preferably from 4 to 20 μm and more preferably from 10 to 17 m. When the thickness of the ink film is 4 μm or greater, it is possible to demonstrate white color which is not affected by the background color of the recording medium. When the thickness of the ink film is 20 μm or less, it is possible to maintain fixability and productivity.

Sedimentation Property of Ink

Sedimentation property of the white ink is evaluated as the sedimentation property of the hollow particles in the white ink. The average of the supernatant relative change amount percentage in the integration of the backscattered light intensity peak due to sedimentation of the hollow particles in the white ink is preferably −2.0 percent or greater after the white ink is left still at 25 degrees C. for 168 hours.

When the average of the supernatant relative change amount percentage is −2.0 percent or greater, the hollow particle does not easily settle out.

The average of the supernatant relative change amount percentage can be measured by, for example, using Turbi Scan Classic MA 2000 manufactured by EKO SEIKI Co., Ltd. in the following manner.

The white ink is subjected to ultrasonic treatment (100 W, 40 minutes) using an ultrasonic cleaner (US-3, manufactured by AS ONE Corporation) to make it homogeneous, and thereafter 5.5 mL of the white ink is loaded into a glass tube dedicated to the cleaner with a pipette (depth 40 mm).

30 minutes after the liquid level of the white ink in the glass tube is stabilized, the ink in the glass tube is irradiated with light and the backscattered light intensity peak is measured. This point in time is determined as the start of sedimentation evaluation. Thereafter, the ink is left still at 25 degrees C. and kept measured for 168 hours. Sedimentation is checked and indicated by deviation display using the start of sedimentation evaluation as reference. The sedimentation property can be checked based on the average of the supernatant relative change percentage in the integration (from 20 mm above the bottom of the sample tube to the liquid level) of the backscattered light intensity peak due to sedimentation of the hollow particles in the white ink after the white ink is left still at 25 degrees C. for 168 hours.

The conditions under which the backscattered light intensity peak is obtained are as follows:

Wavelength of light: 850 nm (near infrared pulse light source)

Measurement angle of backscattered light: 135°

Data collection: Measured every 40 μm

Method of Manufacturing Hollow Particle

The method of preparing the hollow particle is not particularly limited, and a known method can be applied. As the preparation method of the hollow particle, it is possible to employ, for example, the so-called emulsion polymerization method in which vinyl monomers, surfactants, polymerization initiators, and an aqueous dispersion medium are stirred while being heated in nitrogen atmosphere to form a hollow particle emulsion.

An example of the vinyl monomer is a non-ionic monoethylene unsaturated monomer.

Specific examples include, but are not limited to, styrene, vinyl toluene, ethylene, vinylacetate, vinyl chloride, vinylidene chloride, acrylonitrile, (meth)acrylamide, and (meth)acrylate.

Specific examples of the (meth)acrylate include, but are not limited to, methylacrylate, methylmethacrylate, ethyl (meth)acrylate, butyl(meth)acrylate, 2-hydroxyethylmethacrylate, 2-ethylhexyl(meth)acrylate, benzyl(meth)acrylate, lauryl(meth)acrylate, oleyl(meth)acrylate, palmityl(meth)acrylate, and stearyl(meth)acrylate.

In addition, it is possible to use a di-functional vinyl monomer as the vinyl monomer. As the di-functional monomer, specific examples include, but are not limited to, divinylbenzene, aryl methacrylate, ethyleneglycol dimethacrylate, 1,5-butane diol dimethacrylate, diethyleneglyco dimethacrylate, trimethylol propane trimethacrylate. The mono-functional vinyl monomer mentioned above and the di-functional vinyl monomer mentioned above are copolymerized for high level cross linking, so that a hollow particle having good light scattering property, heat resistance, chemical resistance, and solvent dispersibility is obtained.

The vinyl monomer preferably includes styrene and methyl methacrylate, and may optionally furthermore include a nonionic monoethylenically unsaturated monomers and a di-functional vinyl monomer.

As the surfactant, articles forming molecule aggregation such as micelle in water are suitable. Examples are anionic surfactants, non-ionic surfactants, cationic surfactants, and amphoteric surfactants.

As the polymerization initiator, known water-soluble compounds are usable.

Specific examples include, but are not limited to, hydrogen peroxide and potassium persulfate.

Examples of the aqueous solvent medium are water and water containing a hydrophilic organic solvent.

Non-White Ink

The surface tension of the non-white ink is required to be from 20.0 to 30.0 mN/m, more preferably from 20.0 mN/m to 25.0 mN/m, at a bubble lifetime of 1500 ms in terms of striking a balance between wettability to the white ink and discharging stability thereof. When the surface tension at a bubble lifetime of 1,500 ms is 20.0 mN/m or more, wettability to a discharging head is reduced, thereby enhancing discharging stability. Conversely, when the surface tension at a bubble lifetime of 1500 ms is 30.0 mN/m or less, wettability of an image is secured even when the non-white ink is printed on the white ink, thereby enhancing solid filling.

The surface tension of the white ink is preferably 20 mN/m or less and more preferably 35 mN/m or less at 25 degrees C. in terms that the white ink is preferably and suitably leveled on the recording and the drying time of the white ink is shortened.

Furthermore, it is preferable that the ratio (A/B) of the surface tension value A of the non-white ink at a bubble lifetime of 15 ms to the surface tension value B at a bubble lifetime of 1500 ms is 1.20 to 1.50, and more preferably from 1.30 to 1.50. When the ratio A/B is 1.20 or greater, discharging stability can be enhanced. When the ratio A/B is 1.50 or less, solid filling on the white ink can be enhanced.

The surface tension at a bubble lifetime of 15 ms or 1500 ms is a value measured at 25 degrees C. according to the maximum bubble pressure technique, and can be measured using, for example, a dynamic surface tensiometer DynoTester (manufactured by SITA Messtechnik). "Bubble life time" means life length of a bubble produced according to maximum bubble pressure technique and is also referred to as "surface life length", which is from a point in time when a new interface is produced in a probe front end in a dynamic surface tensiometer until the time pressure reaches the maximum bubble pressure.

The contact angle of the non-white ink to a dried film of the white ink according to the drop method is preferably from 10.0° to 35.0°, more preferably from 15.0° to 30.0°, and furthermore preferably from 15.0° to 20.0°. When the contact angle of the non-white ink to the white ink is 10.0° or greater, the nozzle surface that discharges the non-white ink is wet with the non-white ink, which prevents clogging of the nozzle, thereby improving discharging stability. When the contact angle is 35.0° or less, solid filling on the white ink can be improved. The contact angle is measured at 25 degrees C.

The non-white ink of the present disclosure preferably contains an organic solvent, water, a resin, and a surfactant, and optionally contains a lubricant, a coloring material, and an additive.

As the organic solvent contained in the white ink and the non-white ink, the following solvents can be used.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

In addition, when the hydrogen bond term is 3.0 to 6.8 $(cal/cm^3)^{0.5}$ and the boiling point of the organic solvents is 150 to 300 degrees C., fixability becomes good, which is preferable.

Hydrogen bond term can be obtained according to the atomic group aggregation method of treating organic molecules as atomic groups, which was proposed by Krevelen (Krevelen, Properties of Polymer, Third Edition, New York, p200 to p204).

Examples of the organic solvents satisfying these conditions specified above are glycerin, 1,2-propanediol, 1,3-propanediol, 1,2-butanediol, 1,3-butanediol, isoprene glycol, and oxetane compounds, which are particularly preferable.

As the organic solvent used for the white ink and the non-white ink of the present disclosure, the mixing solubility parameter value (hereinafter referred to as SP value) calculated from the solubility parameter of the organic solvents excluding water in the ink is preferably from 11.5 to 15.5 $[cal/cm^3]^{0.5}$. When the mixing SP value of the organic solvents excluding water is 11.5 $[cal/cm^3]^{0.5}$ or more, dissolution of the resin of the hollow particles in the organic solvent can be reduced. Conversely, when the mixing SP value of the organic solvents excluding water is 15.5 $(cal/cm^3)^{0.5}$ or less, it is possible to reduce deterioration of fixability ascribable to poor drying.

For the white ink, the mixing SP value calculated from the SP values of the organic solvents excluding water in the ink is 11.5 to 15.5 $[cal/cm^3]^{0.5}$, which makes it possible to reduce dissolution of the resin of the hollow particles in the organic solvents in the white ink.

Furthermore, for the non-white ink, the mixing SP value calculated from the SP values of the organic solvents excluding water in the ink is 11.5 to 15.5 $[cal/cm^3]^{0.5}$, which makes it possible to prevent the organic solvents in the non-white ink from dissolving the resin of the hollow particles contained in the printing layer formed with the white ink.

The mixing SP value of the organic solvents contained in ink is calculated by the following relation. The total volume of the organic solvents in the ink is set to 1, and the volume fraction and the SP value of each solvent are calculated.

Mixing SP value $(cal/cm^3)^{0.5}$ of organic solvents in ink=[SP value of organic solvent $A$×volume fraction of organic solvent $A$]+ . . . +[SP value of organic solvent $Z$×volume fraction of organic solvent $Z$]

In addition, although the organic solvents for use in the present disclosure includes articles classified as permeating agents, defoaming agents, etc. in terms of functionality, only the organic solvents accounting for 3 percent by mass or more of the ink is counted in the above-mentioned calculation of the SP.

Resins can be added to the white ink and the non-white ink for the purpose of improving fixability of the ink, etc.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Resin particles made of such resins can be also used. It is possible to mix a resin emulsion in which the resin particles are dispersed in water as a dispersion medium with materials such as a coloring material and an organic solvent to obtain an ink. It is possible to use a suitably-synthesized resin particle as the resin particle. Alternatively, the resin particle is available on the market. These resin particles can be used alone or in combination.

In order to prevent crushing of hollow particles due to an impact, etc., Rockwell hardness (JIS Z 2245, JIS B 7726) of the resin particle is preferably from 80 to 130, more preferably from 80 to 110.

The volume average particle diameter of the resin particle is preferably from 10 to 1,000 nm, more preferably from 10 to 200 nm, and furthermore preferably from 100 to 150 nm to obtain good fixability and high image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 1 to 20 percent by mass to the total amount of the ink.

It is preferable that the mixing SP value calculated from the SP values of the resins be from 7.5 to 10.0 $(cal/cm^3)^{0.5}$. When the mixing SP value is 7.5 $(cal/cm^3)^{0.5}$ or greater, it is possible to reduce dissolution of the resin of the hollow particle by the resin. Conversely, when the mixing SP value is 10.0 $(cal/cm^3)^{0.5}$ or less, deterioration of fixability can be prevented.

For the white ink, the mixing SP value calculated from the SP values of the resins in the ink is 7.5 to 10.0 $[cal/cm^3]^{0.5}$, which makes it possible to reduce dissolution of the resin of the hollow particles in the resin in the white ink.

Furthermore, for the non-white ink, the mixing SP value calculated from the SP values of the resin in the ink is 7.5 to 10.0 $[cal/cm^3]^{0.5}$, which makes it possible to prevent the resin in the non-white ink from dissolving the resin of the hollow particles contained in the printing layer formed with the white ink.

In addition, the mixing SP value of the resin contained in the ink is calculated by the following relation. The total volume of the resin in the ink is set to 1, and the volume fraction and SP value of each resin are calculated.

Mixing SP value $(cal/cm^3)^{0.5}$ of resins in ink=[SP value of resin $A$×volume fraction of resin $A$]+ . . . +[SP value of resin $Z$×volume fraction of resin $Z$]

In addition, the mixing SP value is calculated only for articles accounting for 1 percent by mass or more of the entire of ink in the present disclosure.

The non-white ink may contain a coloring material. Specific examples include, but are not limited to the following:

Coloring Material

The coloring material has no particular limit. For example, pigments and dyes are suitable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

As the coloring material for use in metallic ink, for example, a fine powder obtained by finely pulverizing a metal simple substance, an alloy, or a metal compound can be used. Specific examples include, but are not limited to, fine powders obtained by finely-pulverizing metal selected from the group consisting of aluminum, silver, gold, nickel, chrome, tin, zinc, indium, titanium, silicon, copper, and platinum or alloyed metal thereof or an oxide, a nitride, or a sulfide, or a carbide of the metal and alloyed metal, and any combination thereof.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

The particle diameter of the solid portion in ink has no particular limit and can be suitably selected to suit to a particular application. For example, the maximum frequency in the maximum number conversion is preferably from 20 to 1,000 nm and more preferably from 20 to 600 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Lubricant

It is preferable to add a lubricant such as wax or a siloxane compound to the white ink and the non-white ink for use in the present disclosure in order to impart slippage to an image area.

Of the wax, polyethylene wax or carnauba wax is preferable in terms of film formation property and slippage in particular when an ink is applied to an image formed area.

The melting point of the wax is preferably from 80 to 140 degrees C. and more preferably from 100 to 140 degrees C. When the melting point is 80 degrees C. or higher, wax does not excessively melt or coagulate in a room temperature environment, so that storage stability of ink is maintained. When the melting point is 140 degrees C. or lower, wax melts sufficiently in room temperature environment, so that slippage is imparted to the ink.

The particle diameter of the wax is preferably 0.01 m or greater and more preferably from 0.01 to 0.1 μm. When the particle diameter is 0.01 μm or greater, wax particles tend to be oriented to the surface of an ink, thereby imparting slippage to the ink.

As an example of the polyethylene wax, products available on the market such as High-Tech series, manufactured by TOHO Chemical Industry Co., Ltd. and AQUACER SERIES, manufactured by BYK are suitable.

The carnauba wax is available on the market. Examples are Selosol 524 and Trasol CN (both manufactured by CHUKYO YUSHI CO., LTD.).

The proportion of the wax is preferably 1 to 10 percent by mass and more preferably 1 to 5 percent by mass.

As the siloxane compound, a polydimethylsiloxane compound is preferable. Specific examples of the siloxane compound available on the market include, but are not limited to, BYK 307, BYK 333, BYK 378, manufactured by BYK Corporation.

The proportion of the siloxane compound is preferably from 1 to 10 percent by mass and more preferably from 1 to 5 percent by mass.

Additive

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from Bye Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

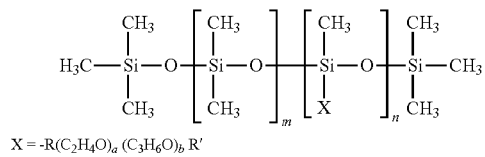

Chemical formula S-1

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

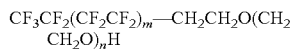

Chemical formula F-1

In the compound represented by Chemical formula F-1, "m" is preferably 0 or an integer of from 1 to 10 and "n" is preferably 0 or an integer of from 1 to 40.

Chemical formula F-2

In the compound represented by Chemical formula F-2, Y represents H or $C_mF_{2m+1}$, where m represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the ink are not particularly limited and can be suitably selected to suit to a particular application. For example, viscosity, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes pH of the ink is preferably from 7 to 12 and more preferably from 8 to 11 in terms of prevention of corrosion of metal material in contact with liquid.

The ink set of the present disclosure can be used together with various processing solutions.

As the processing fluid, examples are pre-processing fluid and post-processing fluid.

Pre-Processing Fluid

The pre-processing fluid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing fluid can be used.

The type of the flocculant is not particularly limited. For example, water-soluble cationic polymers, acids, and multivalent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Recording Medium

The recording medium for use in recording is not particularly limited. Specific examples include, but are not limited to, plain paper, gloss paper, special paper, cloth, film, transparent sheets, printing paper for general purpose.

The recording medium is not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The ink recorded matter of the present disclosure includes a recording medium and an image formed on the recording medium with the ink of the present disclosure.

By recording according to an inkjet recording device and an inkjet recording method, the recorded matter is obtained.

Recording Method and Ink Discharging Device

The recording method of the present disclosure includes applying the white ink of the ink set of the present disclosure to a recording medium and applying the non-white ink of the ink set to the recording medium.

It is preferable to have a step of applying the non-white ink after the step of applying the white ink, and it is preferable to have a step of drying the applied white ink after the step of applying the white ink.

The ink discharging device of the present disclosure includes an ink and an ink discharging head including a nozzle to discharge the ink, and the ink is the non-white ink and the white ink of the ink set of the present disclosure.

The ink discharging head preferably includes a plurality of individual liquid chambers communicating with the nozzle, an inflow channel to allow the ink to flow into the individual liquid chambers, and an outflow channel to allow the ink out of the individual liquid chambers, and the ink discharging device further includes a circulation channel to allow and circulate the ink out of the outflow channel into the inflow channel, and a negative pressure generating device to generate a negative pressure to allow the ink out of individual liquid chambers.

Figure 2:
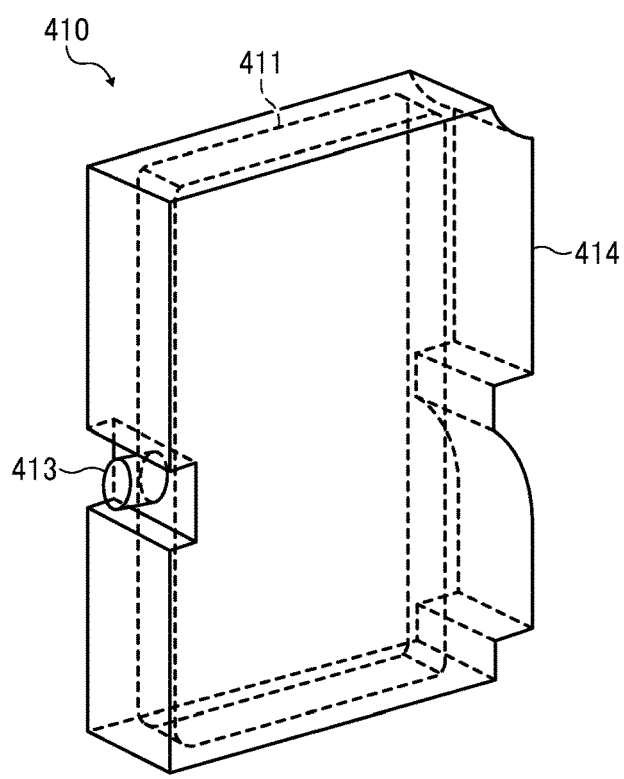
FIG. 2 is a diagram illustrating a perspective view of a main tank to accommodate the ink of the ink set according to an embodiment of the present disclosure.

The ink discharging device is described using an example with reference to FIG. 1 and FIG. 2. FIG. 1 is a diagram illustrating a side view of the recording device. FIG. 2 is a diagram illustrating a perspective view of the main tank. An image forming apparatus 400 as an example of the ink discharging device is of a serial type. A mechanical unit 420 is disposed in an exterior 401 of the image forming apparatus 400. Each ink accommodating unit (ink container) 411 of each main tank 410 (410$k$, 410$c$, 410$m$, 410$y$, 410W) for each color of black (K), cyan (C), magenta (M), yellow (Y), and white (W) is made of packing material such as aluminum laminate film. The ink accommodating unit 411 is housed in, for example, a plastic container housing unit 414. As a result, the main tank 410 is used as an ink cartridge of each color.

Each ink discharging outlet 413 of the main tank 410 communicates with a discharging head for each color via a supplying tube 436 for each color so that the discharging head can discharge the ink to a recording medium. In addition, the image forming apparatus 400 includes a drying assembly 501 (a pre-heater to warm a recording medium before printing, a drum heater or drier to dry the medium after printing).

In the present disclosure, the discharging sequence of inks can be changed depending on the usage conditions of a user. For example, it is possible to apply white ink first to create a background on color paper and thereafter print white ink on a colored paper.

Figure 3:
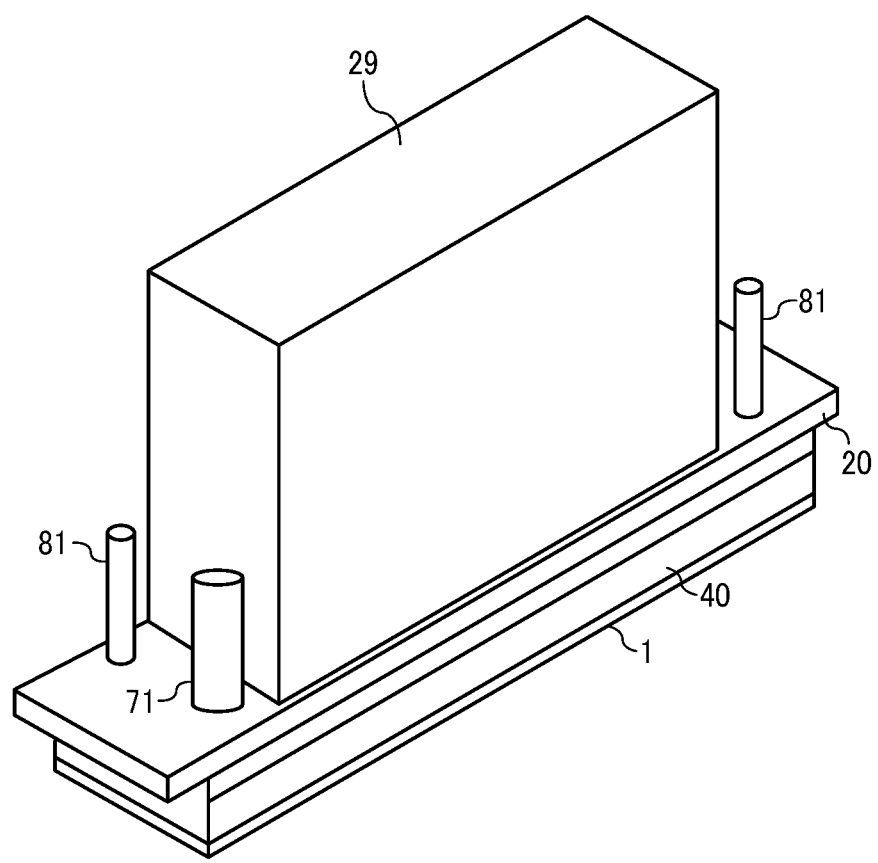
FIG. 3 is a diagram illustrating an exterior perspective view illustrating an ink discharging head according to an embodiment of the present disclosure.
Figure 4:
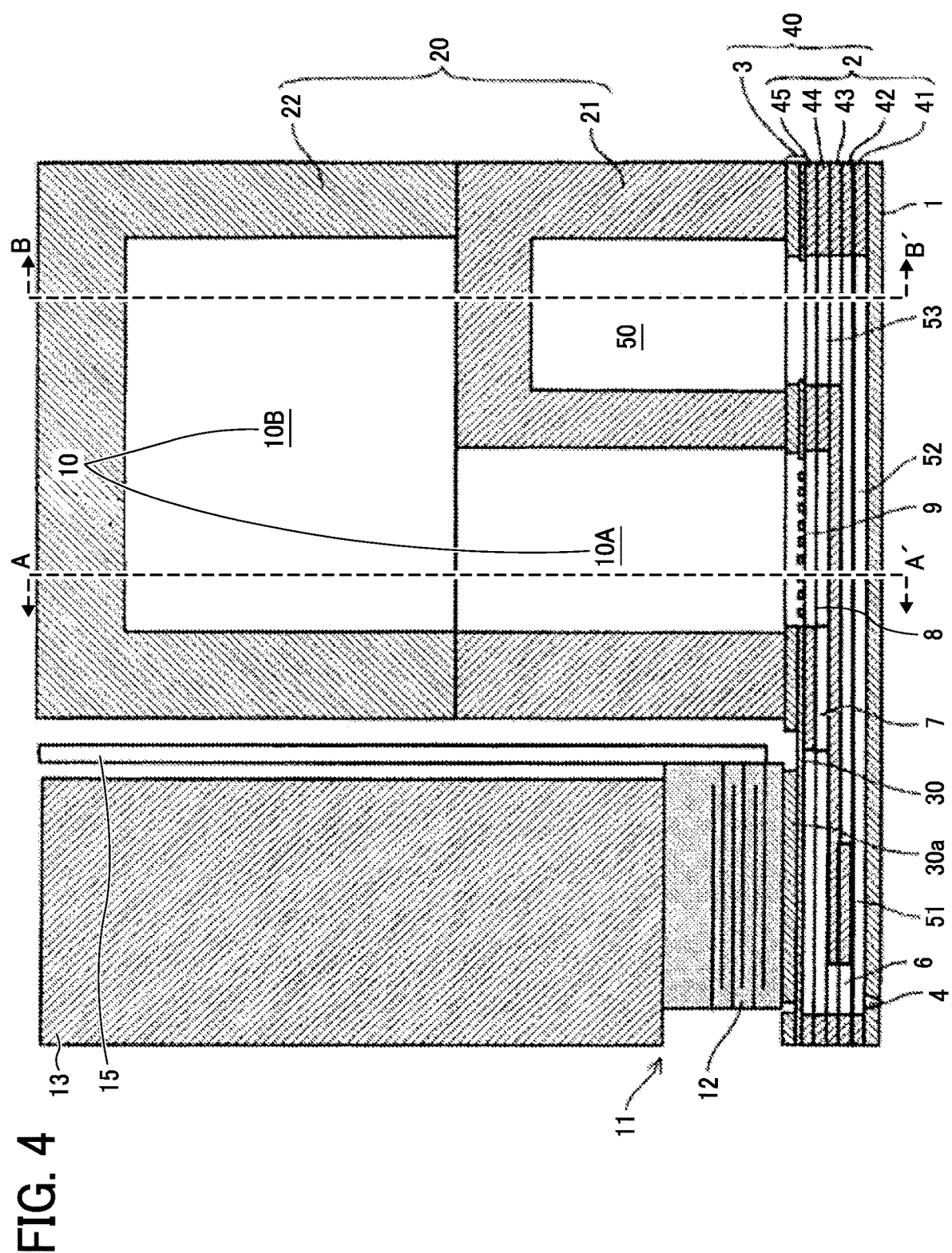
FIG. 4 is a diagram illustrating a cross section of the ink discharging head illustrated in FIG. 3 in a direction orthogonal to the nozzle arrangement direction thereof.
Figure 5:
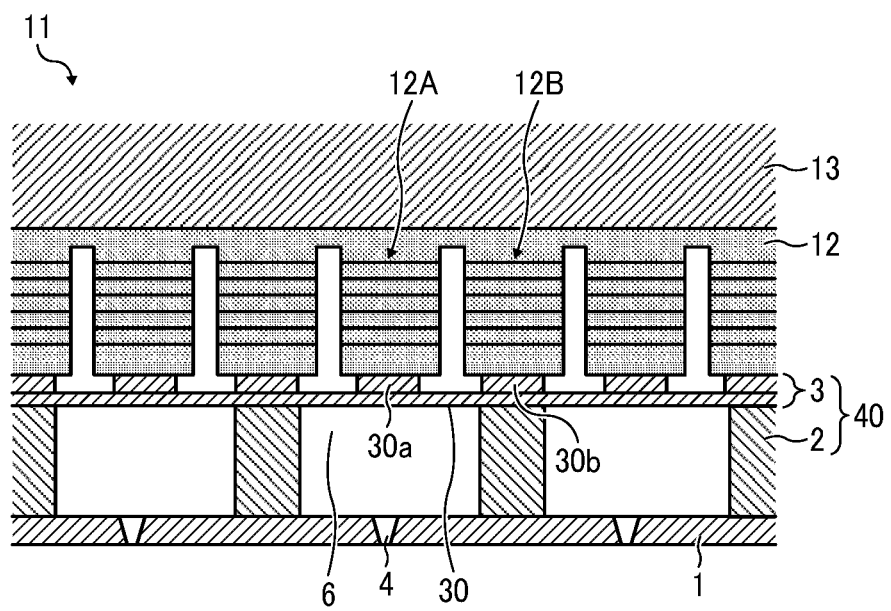
FIG. 5 is a diagram illustrating a partial cross section of the ink discharging head illustrated in FIG. 3 in a direction parallel to the nozzle arrangement direction thereof.
Figure 6:
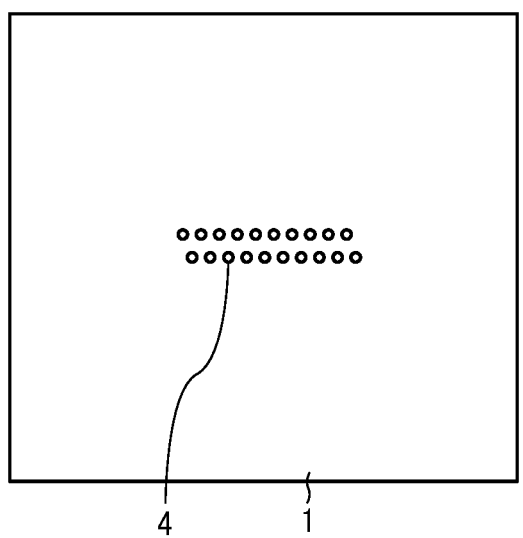
FIG. 6 is a diagram illustrating a planar view of the nozzle plate of the ink discharging head illustrated in FIG. 3.

Ink Discharge Device Having Circulation Type Discharging Head and Ink Discharging Method An example of the circulation type discharging head is described below with reference to FIGS. 3 to 8. FIG. 3 is a diagram illustrating an exterior perspective view of the ink discharging head, FIG. 4 is a diagram illustrating a cross-section of the same head in the direction perpendicular to the nozzle arrangement direction, FIG. 5 is a diagram illustrating a cross-sectional explanatory view of the same head in a direction parallel to the nozzle arrangement direction, FIG. 6 is a diagram illustrating a planar explanatory view of the nozzle plate of the same head, FIG. 7 is a diagram illustrating a planar explanatory view of each member constituting the flow channel member of the same head, and FIG. 8 is a diagram illustrating a planar explanatory view of each member constituting the common liquid chamber member of the same head.

In the ink discharging head, a nozzle plate 1, a flow channel plate 2, and a diaphragm plate member as wall member are laminated and attached to each other. Also, the ink discharging head includes a piezoelectric actuator 11 to displace the diaphragm plate member, a common liquid chamber member 20, and a cover 29.

The nozzle plate 1 includes multiple nozzles 4 to discharge ink.

The flow channel plate 2 forms the individual liquid chamber 6 communicating with the nozzle 4, the fluid resistance 7 communicating with the individual liquid chamber 6, and the liquid introducing portion 8 communicating with the fluid resistance 7. In addition, the flow channel plate 2 is formed of a plurality of plate-like members 41 to 45 laminated and attached to each other from the side of the nozzle plate 1. These plate-like members 41 to 45 and the diaphragm plate member are laminated and attached to each other to form a flow channel member 40.

The diaphragm plate member includes a filter portion 9 as an orifice causing the liquid introducing portion 8 to communicate with the common liquid chamber 10 formed of the common liquid chamber member 20.

The inflow channel is connected to the individual liquid chamber 6 and disposed upstream of the individual liquid chamber 6. The liquid introduction part 8 and the common liquid chamber 10 form the inflow channel.

The diaphragm plate member 3 is a wall surface member forming the wall surface of the individual liquid chamber 6 of the flow channel plate 2. This diaphragm plate member has a double layer structure (but not limited to double) formed of a first layer forming a thin portion and a second layer forming a thick portion from the side of flow channel plate 2. The first layer forms a transformable vibration area 30 at the site corresponding to the individual liquid chamber 6.

The nozzle plate 1 includes multiple nozzles 4 in a zigzag manner as illustrated in FIG. 6.

Figure 7A:
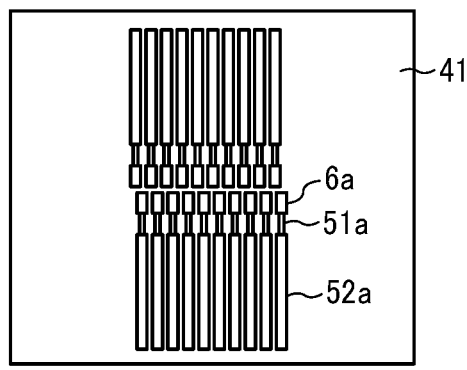
FIGS. 7A to 7F are diagrams illustrating planar views of each member constituting a flow channel member of the ink discharging head illustrated in FIG. 3.

On the plate-like member 41 forming the flow channel plate 2, a through-hole groove portion 6a (through hole having a groove-like form) constituting the individual liquid chamber 6, and through hole groove portions 51a and 52a constituting the fluid resistance 51 and the circulation flow channel 52 are formed as illustrated in FIG. 7A.

Figure 7B:
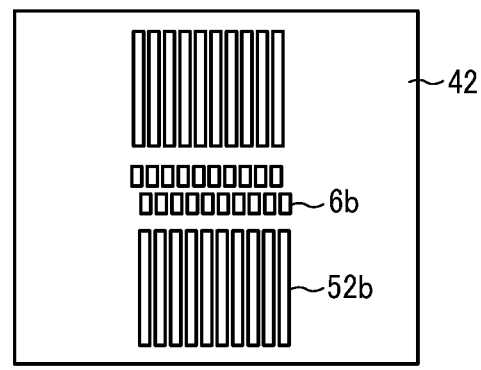

Similarly, on the plate-like member 42, a through-hole groove portion 6b constituting the individual liquid chamber 6 and a through hole groove portion 52b constituting the circulation flow channel 52 are formed as illustrated in FIG. 7B.

Figure 7C:
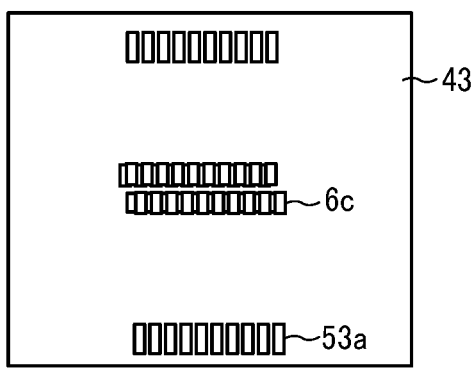

Similarly, on the plate like member 43, a through-hole groove portion 6c constituting the individual liquid chamber 6 and a through hole groove portion 53a constituting a circulation flow channel 53 with the nozzle disposition direction along the longitudinal direction are formed as illustrated in FIG. 7C.

Figure 7D:
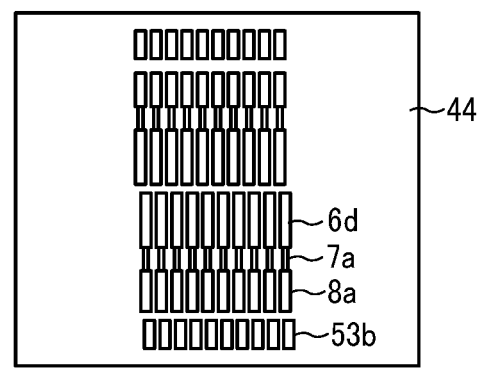

Similarly, on the plate like member 44, a through-hole groove portion 6d constituting the individual liquid chamber 6, a through-hole groove portion 7a constituting the fluid resistance 7, a through-hole groove portion 8a constituting the liquid introducing portion 8, and a through-hole groove portion 53b constituting the circulation flow channel 53 with the nozzle disposition direction along the longitudinal direction are formed as illustrated in FIG. 7D.

Figure 7E:
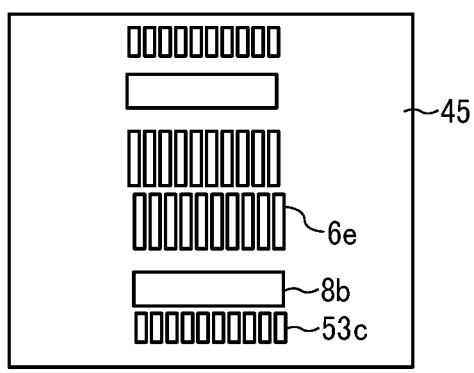

Similarly, on the plate like member 45, a through-hole groove portion 6e constituting the individual liquid chamber 6, a through-hole portion 8b (forming liquid chamber on the downstream of the filter) constituting the liquid introducing portion 8 with the nozzle disposition direction along the longitudinal direction, and a through hole groove portion 53c constituting a circulation flow channel 53 with the nozzle disposition direction along the longitudinal direction are formed as illustrated in FIG. 7E.

Figure 7F:
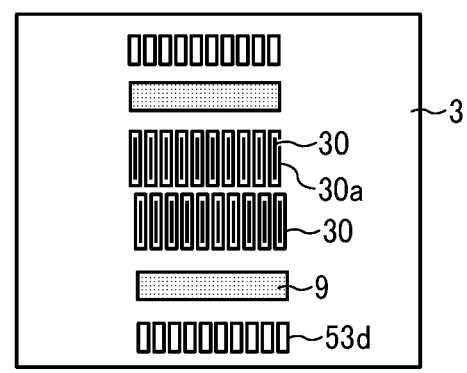

Similarly, on the plate like member 3, the vibration area 30, the filter portion 9, and a through-hole groove portion 53d constituting the circulation flow channel 53 with the nozzle disposition direction along the longitudinal direction are formed as illustrated in FIG. 7F.

Such a simple configuration of the flow channel member constituted of multiple laminated and attached plate-like members can form complicated flow channels.

According to this configuration, on the flow channel member 40 formed of the flow channel plate 2 and the diaphragm plate member, the fluid resistance 51 along the surface direction of the flow channel plate 2 communicating with each of the individual liquid chambers 6, the circulation flow channel 52, and the circulation flow channel 53 disposed along the thickness direction of the flow channel member 40 communicating with the circulation flow channel 52 are formed. The circulation flow channel 53 communicates with a circulation common liquid chamber 50, which is described later.

The outflow channel is connected to the individual liquid chamber 6 and disposed downstream of the individual liquid chamber 6. The circulation flow channels 52 and 53 and the circulation common liquid chamber 50 form the outflow channel.

The common liquid chamber member 20 includes the common liquid chamber 10 and the circulation common liquid chamber 50 to which the ink is supplied from the supply and circulation assembly 494.

Figure 8A:
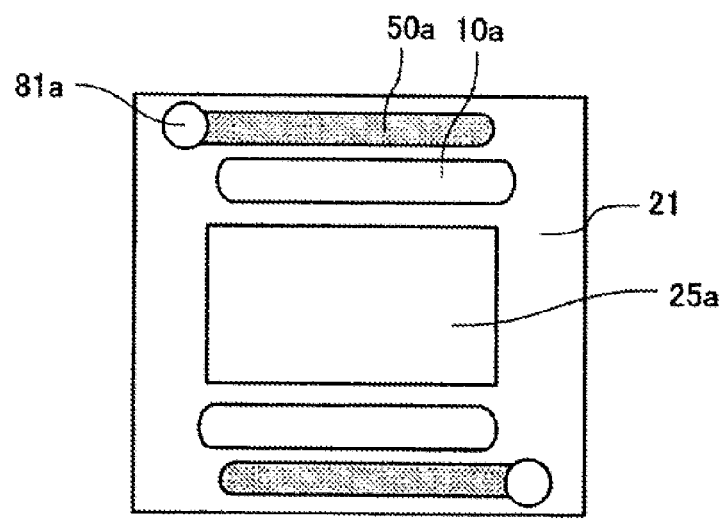
FIGS. 8A and 8B are diagrams illustrating planar views of each member constituting a common liquid chamber member of the ink discharging head illustrated in FIG. 3.

As illustrated in FIG. 8A, on a first common liquid chamber member 21 constituting the common liquid chamber 20, there are formed a through hole 25a for piezoelectric actuator, a through hole groove portion 10a constituting a common liquid chamber 10A on the downstream, and a groove portion 50a with a basement, which constitutes the circulation common liquid chamber 50.

Figure 8B:
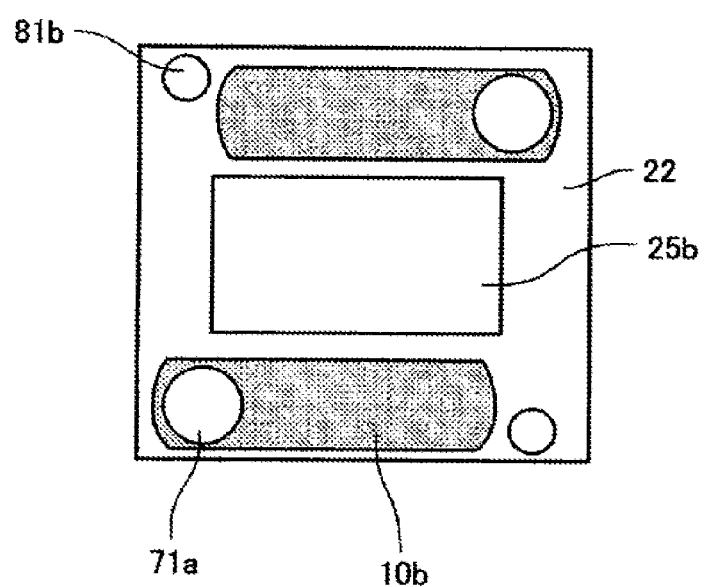

As illustrated in FIG. 8B, on a second common liquid chamber 22, there are formed a through hole 25b for piezoelectric actuator and a groove portion 10b constituting a common liquid chamber 10B on the upstream.

In addition, as illustrated in FIG. 3, on the second common liquid chamber 22, there are formed a through hole 71a as a supplying opening communicating one end of the common liquid chamber 10 in the nozzle arrangement direction with a supply port 71.

On the first common liquid chamber member 21 and the second common liquid chamber 22, there are formed through holes 81a and 81b communicating the other end (the end on the opposite side of the through hole 71a) of the circulation common liquid chamber 50 in the nozzle arrangement direction with a circulation port 81.

Note that, in FIGS. 8A and 8B, the groove portion with a basement is illustrated in solid (this applies to the drawings below).

The common liquid chamber member 20 is constituted of the first common liquid chamber member 21 and the second common liquid chamber member 22. The first common liquid chamber member 21 is attached to the flow channel member 40 on the side of the diaphragm plate member and the second common liquid chamber member 22 is laminated and attached to the first common liquid chamber member 21.

The first common liquid chamber member 21 forms a common liquid chamber 10A on the downstream side, which partially constitutes the common liquid chamber 10 communicating with the liquid introducing portion 8 and the circulation common liquid chamber 50 communicating with the circulation flow channel 53. In addition, the second common liquid chamber member 22 forms a common liquid chamber 10B on the upstream side, which constitutes the rest of the common liquid chamber 10.

The common liquid chamber 10A on the downstream side forming a part of the common liquid chamber 10 and the circulation common liquid chamber 50 are disposed side by side in the direction orthogonal to the nozzle arrangement direction. Also, the circulation common liquid chamber 50 is disposed at the position projected in the common liquid chamber 10.

Due to this, the dimension of the circulation common liquid chamber 50 obtains freedom of designing from the dimension required for the flow channels including the individual liquid chamber 6, the fluid resistance 7, and the liquid introducing portion 8 formed of the flow channel member 40.

Moreover, since the circulation common liquid chamber 50 and a part of the common liquid chamber 10 are disposed side by side and the circulation common liquid chamber 50 is positioned in the projection thereof in the common liquid chamber 10, the width of the head along the direction orthogonal to the nozzle arrangement direction can be reduced, thereby preventing a size increase of the head. The common liquid chamber member 20 includes the common liquid chamber 10 and the circulation common liquid chamber 50 to which ink is supplied from a head tank or an ink cartridge.

On the side of the diaphragm plate member opposite to the individual liquid chamber 6 is arranged the piezoelectric actuator 11 including an electromechanical transducer element as a drive device to transform the vibration area 30 of the diaphragm plate member.

As illustrated in FIG. 5, this piezoelectric actuator 11 includes a piezoelectric member 12 attached to a base member 13. The piezoelectric member 12 is grooved by half cut dicing and a particular number of piezoelectric elements 12A and 12B having a pillar-like form are formed on the single piezoelectric member 12 in a pectinate manner spaced a predetermined distance therebetween.

Although the piezoelectric element 12A of the piezoelectric element 12 is used as a piezoelectric element driven by a drive waveform and the piezoelectric element 12B of the piezoelectric element 12 is used as a simple supporting pillar without an application of a drive waveform, all of the piezoelectric elements 12A and the piezoelectric elements 12B can be used as piezoelectric elements driven by drive waveforms.

The piezoelectric element 12A is jointed to a convex part 30a, which is a thick part having an island-like form formed on the vibration area 30 of the diaphragm plate member 3. The piezoelectric element 12B is jointed to a convex part 30b, which is a thick part of the diaphragm plate member 3.

This piezoelectric member 12 is formed by alternately laminating piezoelectric layers and inner electrodes. Each of the inner electrodes is pulled out to the exterior to provide outer electrodes, to which flexible wiring members 15 is connected.

In the circulation type discharging head having such a configuration, for example, the piezoelectric element 12A shrinks by lowering the voltage applied to the piezoelectric element 12A from a reference voltage. For this reason, the vibration area 30 of the diaphragm plate member 3 is lowered, thereby inflating the volume of the individual liquid chamber 6, so that the ink flows into the individual liquid chamber 6.

Thereafter, the piezoelectric element 12A is elongated in the lamination direction by raising the voltage applied to the piezoelectric element 12A to transform the vibration area 30 of the diaphragm plate member 3 toward the nozzle 4 direction, thereby reducing the volume of the individual liquid chamber 6. As a result, the ink in the individual liquid chamber 6 is under pressure, so that the ink is discharged from the nozzle 4.

Thereafter, the voltage applied to the piezoelectric element 12A is returned to the reference voltage. Accordingly, the vibration area 30 of the diaphragm plate member 3 is back to the initial position so that the individual liquid chamber 6 inflates, which generates a negative pressure. At this point in time, the ink is supplied from the common liquid chamber 10 to the individual liquid chamber 6. After the vibration of the meniscus surface of the nozzle 4 decays and becomes stable, the system starts operations to discharge next droplets.

The drive method of the head is not limited to the above-mentioned (pull-push discharging). The way of discharging changes depending on how a drive waveform is imparted. In addition, in the embodiment described above, the laminated piezoelectric element is used as a pressure-generating device to change the pressure to the individual liquid chamber 6 but not limiting. For example, a piezoelectric element having a thin film can be used. Moreover, it is also possible to use a heat element which is disposed in the individual liquid chamber 6 and generates heat to produce air bubbles to change the pressure or an element causing a pressure change utilizing the electrostatic force.

Next, an example of the ink circulation system using the circulation type discharging head is described with reference to FIG. 9.

Figure 9:
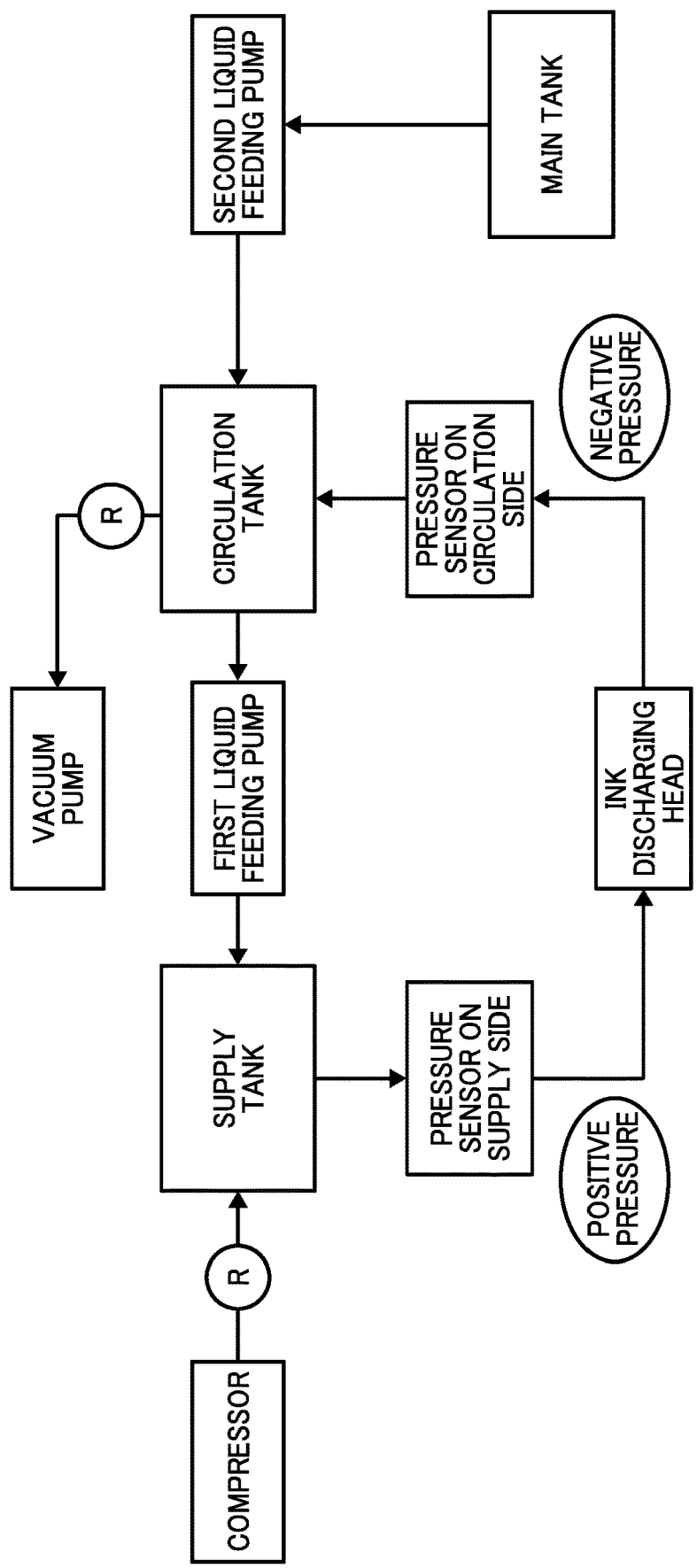
FIG. 9 is a block diagram illustrating an example of the ink circulation system relating to the present disclosure.

FIG. 9 is a block diagram illustrating the ink circulation system.

As illustrated in FIG. 9, the ink circulation system includes a main tank, an ink discharging head, a supply tank, a circulation tank, a compressor, a vacuum pump, a liquid feeding pump, a regulator (R), a pressure sensor on the supply side, a pressure sensor on the circulation side, etc. The vacuum pump corresponds to a device to generate a negative pressure. The pressure sensor on the supply side is disposed between the supply tank and the ink discharging head and connected on the supply flow channel side connected to the supply port 71 (FIG. 3) of the ink discharging head. The pressure sensor on the circulation side is disposed between the ink discharging head and the circulation tank and connected to the circulation flow channel side connected with the circulation port 81 (FIG. 3) of the ink discharging head.

One end of the circulation tank is connected to the supply tank via the first liquid feeding pump and, the other end, with the main tank via the second liquid feeding pump. Due to this configuration, the ink flows from the supply tank into the ink discharging head through the supply port 71 and ejected through the circulation port to the circulation tank. Furthermore, the ink is sent from the circulation tank to the supply tank by the first liquid feeding pump so that the ink is circulated.

In addition, a compressor is connected to the supply tank, which is controlled to detect a predetermined positive pressure by the pressure sensor on the supply side. In addition, a vacuum pump is connected to the circulation tank, which is controlled to detect a predetermined negative pressure by the pressure sensor on the circulation side. Therefore, the negative pressure of the meniscus can be maintained constant while circulating the ink through the ink discharging head.

In addition, as the liquid droplet is discharged from the nozzle of the circulation type discharging head, the amount of the ink in the supply tank and the circulation tank decreases. Therefore, it is desirable to replenish the ink from the main tank to the circulation tank using the second liquid feeding pump on suitable occasions. When to replenish the ink from the main tank to the circulation tank can be controlled based on the detection result of, for example, a liquid surface sensor disposed in the circulation tank to replenish the ink when the liquid surface height becomes lower than the predetermined height.

Next, the ink circulation in the circulation type discharging head is described. As illustrated in FIG. 3, the supply port 71 communicating with the common liquid chamber and the circulation port 81 communicating with the circulation common liquid chamber 50 are formed at ends of the common liquid chamber member 20. The supply port 71 and the circulation port 81 are respectively connected to the ink supply tank 21 and the circulation tank 41 to store the ink via respective tubes (FIG. 9). The ink stored in the ink supply tank 21 is supplied to an individual liquid chamber 6 via the supply port 71, a common liquid chamber 10, a liquid introducing portion 8, and a fluid resistance 7.

Moreover, while a piezoelectric member 12 is driven to discharge the ink in the individual liquid chamber 6 from a nozzle 4, the entire or the part of the ink accumulated in the individual liquid chamber 6 without being discharged circulates to the circulation tank via a fluid resistance 51, circulation flow channels 52 and 53, a circulation common liquid chamber 50, and the circulation port 81.

The ink can be circulated during both operation and non-operation of the circulation type discharging head. Circulation of the ink during downtime is preferable because the ink in the individual liquid chamber 6 is always refreshed and the components contained in the ink is prevented from agglomerating or setting out. Since sedimentation can be reduced, images with excellent discharging stability can be obtained immediately after restart after a long downtime.

Figure 10:
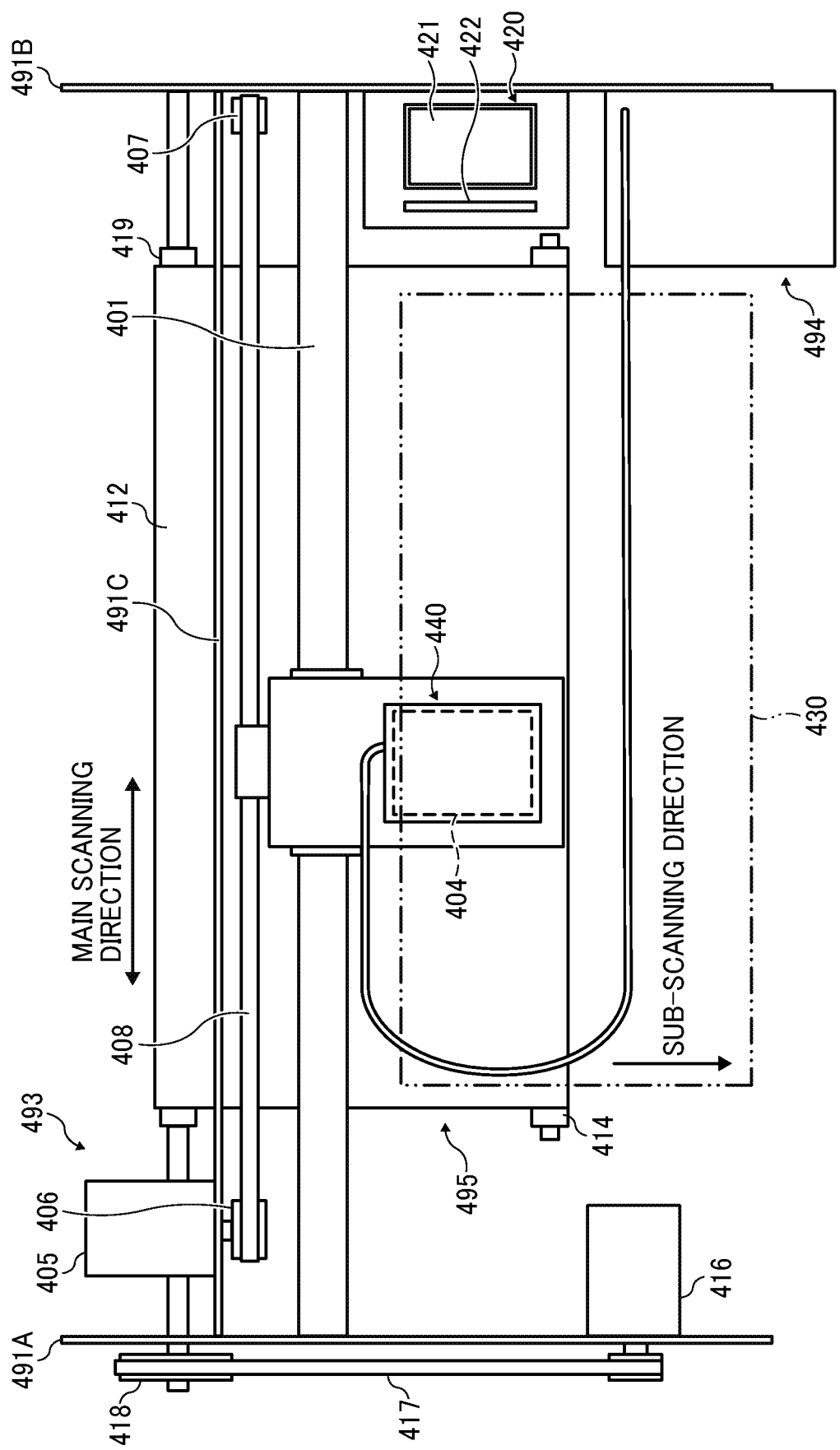
FIG. 10 is a diagram illustrating a planar view of an example of the ink discharging device according to an embodiment of the present disclosure.
Figure 11:
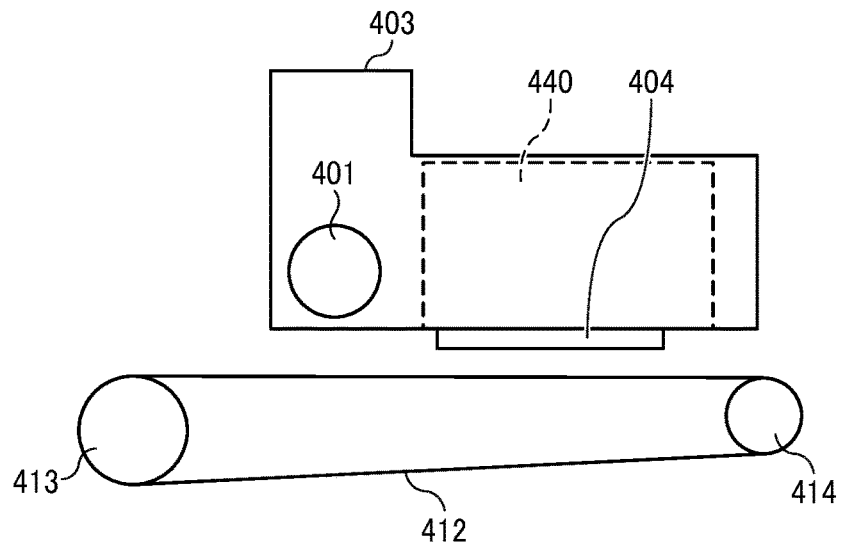
FIG. 11 is a diagram illustrating a side view of the ink discharging device illustrated in FIG. 10.

Next, an example of a device that discharges ink using a circulation type discharging head is described with reference to FIGS. 10 and 11. FIG. 10 is a plane diagram illustrating an example of the substantial part of the device and FIG. 11 is a side view of the substantial part of the device.

This device is of a serial type, and a main scanning moving assembly 493 reciprocates the carriage 403 in the main scanning direction. The main scanning moving assembly 493 includes a guiding member 401, a main scanning motor 405, a timing belt 408, etc. The guiding member 401 is bridged between a side plate 491A and a side plate 491B on the right and left sides, respectively and holds the carriage 403 movable. The main scanning motor 405 reciprocates the carriage 403 in the main scanning direction via the timing belt 408 stretched between a drive pully 406 and a driven pully 407.

An ink discharging unit 440 on which an ink discharging head 404 is mounted is mounted on the carriage 403. The ink discharging head 404 of the ink discharging unit 440 discharges color inks of, for example, yellow (Y), cyan (C), magenta (M), black (K), and white (W). The ink discharging head 404 carries a nozzle line having multiple nozzles along the sub-scanning direction vertical to the main scanning direction with the ink discharging surface downward.

The supply and circulation assembly 494 supplies and circulates ink in the ink discharging head 404 to supply the ink stored outside the ink discharging head 404 to the ink discharging head 404. In this embodiment, the supply and circulation assembly 494 includes a supply tank, a circulation tank, a compressor, a vacuum pump, a liquid feeding pump, a regulator (R), etc. The pressure sensor on the supply side is disposed between the supply tank and the ink discharging head 404 and connected on the supply flow channel side connected to the supply port 71 of the ink discharging head 404. The pressure sensor on the circulation side is disposed between the ink discharging head 404 and the circulation tank and connected to the circulation flow channel side connected to the circulation port 81 of the ink discharging head 404.

This device includes a conveyance assembly 495 to convey a recording medium 430. The conveyance assembly 495 includes a conveying belt 412 as a conveying device and a sub-scanning motor 416 to drive the conveyor belt 412.

The conveyor belt 412 adsorbs the recording medium 430 and conveys it to the position facing the ink discharging head 404. The conveyor belt 412 has an endless form, stretched between a conveyor roller 419 and a tension roller 414. The conveyor belt 412 is electrostatically adsorbed or aspirated.

The conveyor belt 412 moves around in the sub-scanning direction by the conveyor roller 419 rotationally driven by the sub-scanning motor 416 via a timing belt 417 and a timing pully 418.

Furthermore, on one side of the carriage 403 in the main scanning direction, a maintenance and recovery assembly 420 to maintain and recover the ink discharging head 404 is disposed on the side of the conveyor belt 412.

The maintenance and recovery assembly 420 includes a capping member 421 to cap a nozzle surface (surface on which the nozzle is formed) of the ink discharging head 404, a wiping member 422 (wiper) to wipe off the nozzle surface, etc.

The main scanning moving assembly 493, the supply and circulation assembly 494, the maintenance and recovery assembly 420, and the conveyance assembly 495 are installed onto a housing including the side plates 491A and 491B and a back plate 491C.

In the image forming device having such a configuration, the recording medium 430 is fed and adsorbed onto the conveyor belt 412 and conveyed along the sub-scanning direction by the rotational movement of the conveyor belt 412.

Thereafter, the ink discharging head 404 is driven in response to an image signal while moving the carriage 403 in the main-scanning direction so that the ink is discharged onto the recording medium 430 standing still to record an image.

Since this device includes a circulation type discharging head, quality images can be stably formed.

Figure 12:
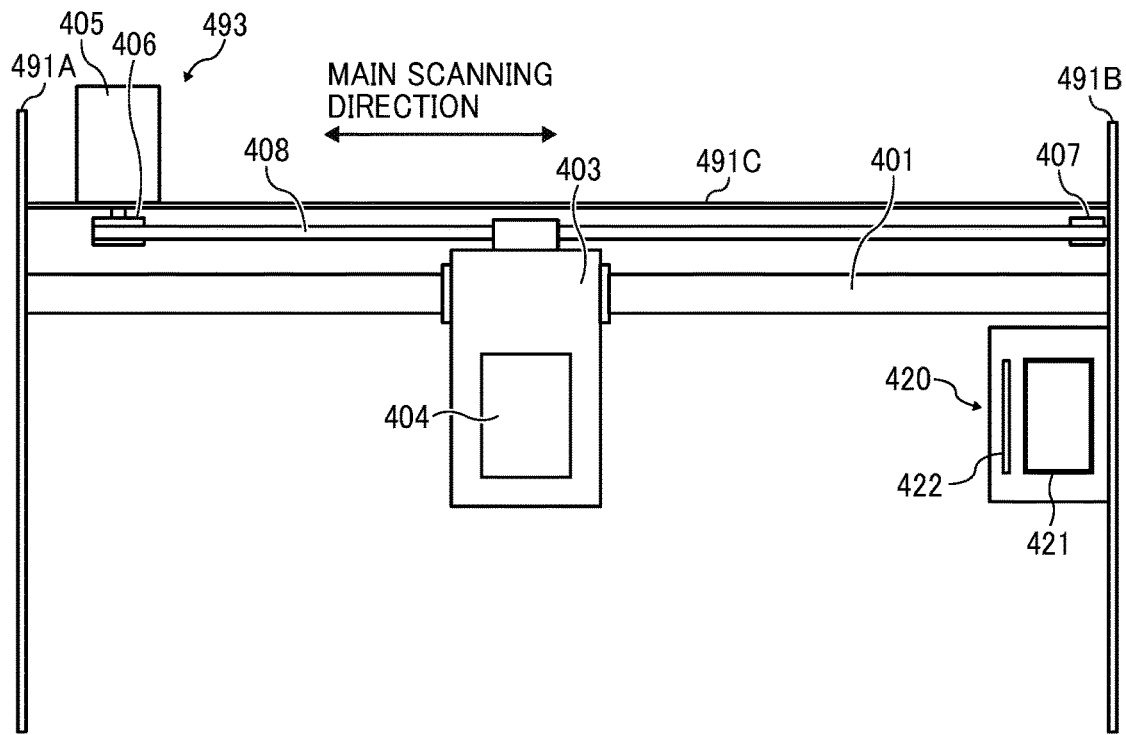
FIG. 12 is a diagram illustrating a planar view of another example of the ink discharging unit relating to the present disclosure.

Next, another example of the ink discharging unit of the present disclosure is described with reference to FIG. 12. FIG. 12 is a plane diagram illustrating the substantial part of the liquid discharging unit.

This ink discharging unit includes the housing portion including the side plates 491A and 491B and the back plate 491C, the main scanning moving assembly 493, the carriage 403, and the ink discharging head 404 of the members constituting the device to discharge the ink.

Optionally, this ink discharging unit may have a configuration such that at least one of the maintenance and recovery assembly 420 and the supply and circulation assembly 494 is further attached to, for example, the side plate 491B.

In the present disclosure, the ink discharging head is a mechanical part to discharge and jet ink from a nozzle.

Articles using piezoelectric actuators (a laminate type piezoelectric element and thin-layer type piezoelectric element), thermal actuators using the thermoelectric conversion element such as a heat element, and an electrostatic actuator including a diaphragm and a counter electrode are suitable as the energy generating source to discharge ink.

The ink discharging unit is a collective form in which a functional part and/or a assembly is integrated in the ink discharging head, meaning an assembly of parts relating to ink discharging. For example, the ink discharging unit includes a combination of the ink discharging head and at least one of a supply and circulation assembly, a carriage, a maintenance and recovery assembly, and a main scanning moving assembly.

Integration means that, for example, the ink discharging head is mutually fastened, attached, engaged, etc. with functional parts or assembly or one is carried by the other in a movable manner. In addition, the ink discharging head and the functional parts or assembles may be detachably attached to each other.

For example, the ink discharging head may be integrated with the supply and circulation assembly as the ink discharging unit. In addition, the ink discharging head can be integrated with the supply and circulation assembly by a tube, etc. Optionally, a unit including a filter may be disposed between the ink discharging head and the supply and circulation assembly of the ink discharging unit.

In addition, the ink discharging head may be integrated with the carriage as the ink discharging unit.

In addition, the ink discharging head may be integrated with a scanning moving assembly as the ink discharging unit while the ink discharging head is held in a movable manner by the guiding member constituting a part of the scanning moving assembly.

In addition, the ink discharging head, the carriage, and the maintenance and recovery assembly may be integrated as the ink discharging unit while the capping member constituting a part of the maintenance and recovery assembly is fastened to the carriage onto which the ink discharging head is mounted.

In addition, the ink discharging head and the supply and circulation assembly may be integrated as the ink discharging unit while the tube is connected with the ink discharging head onto which the supply and circulation assembly or the flow path parts are mounted. Via this tube, the ink in the ink storage source is supplied to the ink discharging head.

The main scanning moving assembly includes the guiding member. In addition, the supplying assembly includes the tube and the installation unit.

In the present disclosure, the ink discharging device includes an ink discharging head or an ink discharging unit and drives the ink discharging head to discharge ink. The ink discharging device is capable of discharging ink to a medium to which the ink is attachable and may be able to discharge the ink into air or a fluid.

The discharging device may include a device that feeds, conveys, or ejects a medium to which can be attached, a pre-processing device, a post-processing device, etc.

For example, the ink discharging device includes an image forming device (recording device) which discharges ink onto a recording medium to form an image thereon and a solid freeform fabrication device (three-dimensional modeling device) which discharges ink (modeling liquid) to laminated powder layers to fabricate a solid freeform object (three dimensional object).

In addition, the ink discharging device is not limited to those which produce meaningful visible images such as texts and figures by the discharged ink. For example, the ink discharging device may form meaningless patterns or 3D objects.

The ink discharging device includes a device in which the ink discharging head and an ink-attachable article relatively move to each other but is not limited thereto.

Specific examples include, but are not limited to, a serial type device in which the ink discharging head is caused to move and a line type device in which the ink discharging head is not caused to move.

Heat Drying Device and Heat Drying Process

The ink discharging device of the present disclosure may optionally include a heat drying device. For example, the heating device and the drying device heat and dry the print surface and the opposite surface of a recording medium. The recording medium can be heated and dried before printing, in the middle of printing, after printing, but it is preferable to provide a heating drying process after the ink discharging process. For example, it is possible to dry a recording medium to which ink is applied by an infrared drying device, a microwave drying device, a roll heater, a drum heater, warm air, etc. In the drying step of drying the white ink and the non-white ink, the heating temperature is preferably from 90 to 200 degrees C., more preferably from 120 to 150 degrees C. The drying time is preferably from 10 to 60 seconds.

Moreover, it is also possible to include a fixing device to smooth and fix an image and also include a fixing process of fixing the image with heat at 100 to 150 degrees C. by a heating device. This fixing process improves gloss and fixability of image recorded matter. A roller or drum heater having a heated mirror surface is suitably used as the heating fixing device and the mirror surface (smoothing portion) of the roll heater and the drum heater is brought into contact with the image surface. Taking into account image quality, safety, and economy, a fixing roller heated to 100 to 150 degrees C. is preferable.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), yellow (Y), and white (W), the pre-processing device and the post-processing device may further include a liquid accommodating unit including a pre-processing fluid and/or a post-processing fluid and a liquid discharging head to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet recording method. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

An apparatus for manufacturing a solid freeform fabrication to fabricate a three-dimensional solid object can be any known device with no particular limit. For example, the apparatus includes an ink container; a supplying device, and a discharging device, a drier, etc. The three-dimensional solid object includes an object manufactured by repeated ink coating. In addition, the three-dimensional solid object includes a molded processed product manufactured by processing a structure having a substrate such as a recording medium to which the ink is applied. The molded processed product is fabricated from printed matter or a structure having a sheet-like form, film-like form, etc. by, for example, heating drawing or punching.

The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto. In Examples, "parts" and "%" are "parts by mass" and "percent by mass" unless otherwise specified.

Manufacturing of Hollow Particle

1. Synthesis of Seed Particle Emulsion 726.0 parts of deionized water, 5.0 parts of methylmethacrylate, and 0.1 parts of methacrylic acid were loaded in a four-necked separable flask equipped with a stirrer, a thermometer, a condenser, and a dripping funnel and thereafter heated while being stirred. When the internal temperature of the separable flask reached 70 degrees C., 1.0 part of 10 percent by mass ammonium persulfate aqueous solution was added and the system was heated at 80 degrees C. for 20 minutes. 141.0 parts of methyl methacrylate, 94.9 parts of metharylic acid, 5.0 parts of alkylbenzene sodium sulfonate (Neogen SF-20, manufactured by DKS Co. Ltd.) as anionic emulsifier, and 120.0 parts of deionized water were emulsified by a homo disperser to prepare a pre-emulsion. Thereafter, the pre-emulsion was loaded in the dripping funnel.

Next, while keeping the internal temperature of the separable flask at 80 degrees C., the thus-prepared pre-emulsion was uniformly dripped in three hours and at the same time, 10.0 percent of 10 percent ammonium persulfate aqueous solution were uniformly dripped in three hours. Subsequent to completion of the dripping, the resultant was aged at 80 degrees C. for three hours followed by cooling-down and filtrated by a filter cloth with 120 mesh to obtain a seed particle emulsion.

2. Synthesis of Hollow Particle

First Step Polymerization 188.2 parts of deionized water was loaded in a four-necked separable flask equipped with a stirrer, a thermometer, a condenser, and a dripping funnel. 66.0 parts of the thus-obtained seed particle emulsion was dripped thereto and thereafter, the resultant was heated to 80 degrees C. while being stirred. 2.4 parts of butyl acrylate, 1.1 parts of butylmethacrylate, 19.5 parts of methyl methacrylate, 0.7 parts of metharylic acid, 5.0 parts of alkylbenzene sodium sulfonate (Neogen SF-20, manufactured by DKS Co. Ltd.), and 55.3 parts of deionized water were emulsified by a homo disperser to prepare a pre-emulsion 1. Thereafter, the pre-emulsion 1 was loaded in the dripping funnel. Next, while keeping the internal temperature of the separable flask at 80 degrees C., the thus-prepared pre-emulsion 1 was uniformly dripped in 30 minutes and at the same time, 1.2 parts of 10 percent sodium persulfate were uniformly dripped in 30 minutes.

Second Step Polymerization 75.0 parts of styrene, 5.0 parts of alkylbenzene sodium sulfonate (Neogen SF-20, manufactured by DKS Co. Ltd.), and 51.8 parts of deionized water were emulsified by a homo disperser to prepare a pre-emulsion 2. Thereafter, the pre-emulsion 2 was loaded in the dripping funnel. One hour after the completion of the dripping of the pre-emulsion 1, the thus-prepared pre-emulsion 2 was uniformly dripped in 60 minutes and at the same time, 3.5 parts of 10 percent sodium persulfate aqueous solution was uniformly dripped in 60 minutes while keeping the internal temperature of the separable flask at 80 degrees C. After the completion of the dripping of the pre-emulsion 2, 7.5 parts of 28 percent by mass ammonium water was dripped and the system was aged at 80 degrees C. for one hour to swell and dissolve the seed particle. Subsequent to cooling down, the resultant was filtrated with a filter cloth of 120 mesh to obtain a hollow resin particle B.

Hollow particle C was manufactured (synthesized) in the same manner except that the amount of styrene in the second step polymerization was 39.0 parts and Hollow particles D was manufactured (synthesized) in the same manner except that the amount of styrene in the second step polymerization was 22.3 parts.

The maximum value X at the absorption band of 1600 $cm^{-1}$ of the hollow particles and the maximum value Y at the absorption band of 1730 $cm^{-1}$ were measured according to a Attenuated Total Reflection method (ATR method) by a microscopic FT-IR measuring instrument (iN10MX/iZ10) and analysis software (OMNIC), manufactured by Thermo Fisher Scientific Inc. The maximum value X and the maximum value Y are values of absorbance.

Synthesis of Dispersant (Copolymer R-1) for Use in Pigment Dispersion of Non-White Ink Synthesis of Monomer 62.0 g (525 mmol) of 1,6-hexanediol (manufactured by Tokyo Chemical Industry Co., Ltd.) was dissolved in 700 mL of methylene chloride (dichloromethane) and thereafter 20.7 g (262 mmol) of pyridine was further added. To this solution, a solution in which 50.0 g (262 mmol) of 2-naphthalene carbonyl chloride (manufacture by Tokyo Chemical Industry Co., Ltd.) was dissolved in 100 ml of dichloromethane was dripped in two hours followed by stirring at room temperature for six hours. Subsequent to rinsing with water, an organic phase was isolated. Next, after drying the organic phase with magnesium sulfide, the solvent was distilled away. The resultant was refined by silica gel column chromatography with a solvent mixture of a methylene chloride and methanol with a volume ratio of 98:2 serving as an eluent to obtain 52.5 g of 2-naphthoic acid-2-hydroxyhexyl ester.

Next, 42.1 g (155 mmol) of 2-naphthoic acid-2-hydroxyhexyl ester was dissolved in 80 mL of dried methylethylketone followed by heating to 60 degrees C. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour while being stirred followed by stirring at 70 degrees C. for 12 hours. Subsequent to cooling down to room temperature, the solvent was distilled away.

The resultant was refined by silica gel column chromatography with a solvent mixture of a methylene chloride and methanol with a volume ratio of 99:1 serving as an eluent to obtain 57.0 g of monomer M-1 represented by the following Chemical structure I-1.

Chemical formula I-1

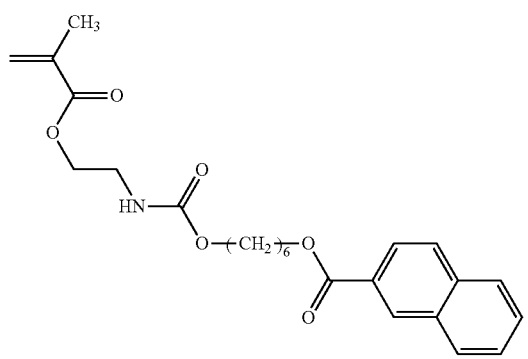

Synthesis of Copolymer R-1

3.80 g (52.7 mmol) of acrylic acid (manufactured by Aldrich Corporation) and 11.26 g (26.3. mmol) of the monomer M-1 were dissolved in 75 mL of dried methylethyl ketone to prepare a monomer solution. The monomer solution was divided into two with a mass ratio of 10 percent to 90 percent. Thereafter, the 10 percent of the monomer solution was heated to 75 degrees C. in an argon atmosphere. 0.59 g (3.61 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for four hours. The resultant was cooled down to room temperature and the thus-obtained reaction solution was dripped to hexane to precipitate a copolymer. The precipitated copolymer was filtrated followed by drying with a reduced pressure to obtain 14.55 g of a copolymer R-1 (mass average molecular weight (Mw): 30,000).

5.00 g (amount of carboxylic group, 17.5 mmol) of the thus-obtained copolymer R-1 was weighed. Thereafter, 7.36 g (content of tetraethylammonium ion: 17.5 mmol) of 35 percent by mass concentration of tetraethylammonium hydroxide aqueous solution (manufactured by Tokyo Chemical Industry Co. Ltd.) and 37.64 g of deionized water were admixed with the weighed copolymer R-1 followed by stirring to prepare 10 percent by mass aqueous solution of the copolymer R-1.

Preparation of Pigment Dispersion

Preparation Example 1

Preparation of Black Pigment Dispersion 16.0 parts of carbon black (NIPEX160, manufactured by Degussa AG) and 44.0 parts of deionized water were added to 40.0 parts of the 10 percent by mass aqueous solution of the copolymer R-1 followed by stirring for 12 hours. Next, using a disk type bead mill (KDL type, manufactured by Shinmaru Enterprises Corporation), the resultant was subject to circulation dispersion at a peripheral speed of 10 m/s for one hour. The used media were zirconia balls having a diameter of 0.3 mm. Furthermore, subsequent to filtration by a membrane filter having a pore diameter of 1.2 µm, deionized water was added in such a manner that the concentration of the pigment was 16 percent by mass to obtain a black pigment dispersion.

Preparation Example 2

Preparation of Cyan Pigment Dispersion

A cyan pigment dispersion having a pigment concentration of 16 percent by mass was obtained in the same manner as in the preparation of black pigment dispersion except that Pigment Blue 15: 3 (Cromofine Blue, manufactured by Dainichiseika Color & Chemicals Mfg. Co., Ltd.) was used instead of carbon black.

Preparation Example 3

Preparation of Magenta Pigment Dispersion

A magenta pigment dispersion having a pigment concentration of 16 percent by mass was obtained in the same manner as in the preparation of the black pigment dispersion except that Pigment Red 122 (manufactured by Clariant, Toner Magenta EO02) was used in place of carbon black.

Preparation Example 4

Preparation of Yellow Pigment Dispersion

A yellow pigment dispersion having a pigment concentration of 16 percent by mass was obtained in the same manner as in the preparation of black pigment dispersion except that Pigment Yellow 74 (Fast Yellow 531, manufactured by Dainichiseika Color & Chemicals Mfg. Co., Ltd.) was used in place of carbon black.

Examples 1 to 25 and Comparative Examples 1 to 6

Adjustment of White Ink and Non-White Ink

The organic solvent, surfactant, defoaming agent, pH regulator, antibacterial agent, and water shown in Tables 1 and 2 were uniformly mixed by stirring for one hour. Next, resin and wax were uniformly admixed therewith by stirring for another hour. Thereafter, hollow particles or a pigment dispersion were added, and the mixture was uniformly mixed by stirring for another hour. This mixture was subjected to pressure filtration with a polyvinylidene fluoride membrane filter (white ink) having an average pore diameter of 5 µm or a polyvinylidene fluoride membrane filter (non-white ink) having an average pore diameter of 0.8 µm to remove coarse particles and dust to obtain white inks W-01 to W-14 and non-white inks C-01 to C-11, K-01, M-01, Y-01 and Clear-01.

The maximum value X of a dried film of the white ink in an absorption band of from 1590 to 1610 $cm^{-1}$ and the maximum value Y in an absorption band of from 1720 to 1740 $cm^{-1}$ were measured according to a Attenuated Total Reflection method (ATR method) by a microscopic FT-IR measuring instrument (iN10MX/iZ10) and analysis software (OMNIC), manufactured by Thermo Fisher Scientific Inc. The maximum value X and the maximum value Y are values of absorbance. The value of the white ink was the same as that of the value of the hollow particle.

TABLE 1

|  |  | W-01 | W-02 | W-03 | W-04 | W-05 |
|---|---|---|---|---|---|---|
| Hollow particle | Hollow particle A |  | 10.00 |  |  |  |
|  | Hollow particle B |  |  |  | 10.00 |  |
|  | Hollow particle C |  |  |  |  | 10.00 |
|  | Hollow particle D | 10.00 |  |  |  |  |
|  | Hollow particle E |  |  | 10.00 |  |  |
| Solvent | Organic solvent A | 5.00 | 5.00 | 5.00 | 5.00 | 5.00 |
|  | Organic solvent B | 18.00 | 18.00 | 18.00 | 18.00 | 18.00 |
|  | Organic solvent E | 16.00 | 16.00 | 16.00 | 16.00 | 16.00 |
|  | Organic solvent G |  |  |  |  |  |
| Resin | Resin particle B | 2.50 | 2.50 | 2.50 | 2.50 | 2.50 |
| Lubricant | Polyethylene wax |  |  |  |  |  |
|  | Carnauba wax |  |  |  |  |  |
|  | Polydimethylsiloxane compound |  |  |  |  |  |
| Surfactant | Surfactant | 1.00 | 1.00 | 1.00 | 1.00 | 1.00 |
| Defoaming agent | Defoaming agent | 0.50 | 0.50 | 0.50 | 0.50 | 0.50 |
| Antibacterial Agent | Antibacterial Agent | 0.10 | 0.10 | 0.10 | 0.10 | 0.10 |
| pH regulator | pH regulator | 0.50 | 0.50 | 0.50 | 0.50 | 0.50 |
| Water | Deionized water | 46.40 | 46.40 | 46.40 | 46.40 | 46.40 |
|  | Total | 100.00 | 100.00 | 100.00 | 100.00 | 100.00 |
| Evaluation | Y/X ratio of white ink | 6.0 | 1.5 | 9.3 | 3.0 | 4.5 |
|  | Addition amount of Hollow particle [%] | 10.0 | 10.0 | 10.0 | 10.0 | 10.0 |
|  | Sedimentation property of white ink [%] | −0.8 | −0.5 | −15.0 | −0.6 | −0.8 |
|  | Addition of lubricant [%] | 0.0 | 0.0 | 0.0 | 0.0 | 0.0 |
|  | Lightness of solid white area (dryness) | 72.0 | 12.1 | 46.8 | 70.2 | 72.1 |
|  | Storage stability of white ink | +0.8 | −0.7 | Separation | −1.1 | +0.7 |
|  | Mixing SP value of organic solvent $(cal/cm^3)^{0.5}$ | 13.3 | 13.3 | 13.3 | 13.3 | 13.3 |

|  |  | W-06 | W-07 | W-08 | W-09 | W-10 |
|---|---|---|---|---|---|---|
| Hollow particle | Hollow particle A |  |  |  |  |  |
|  | Hollow particle B |  |  |  |  |  |
|  | Hollow particle C |  |  |  |  |  |
|  | Hollow particle D | 3.00 | 5.00 | 20.00 | 25.00 | 10.00 |
|  | Hollow particle E |  |  |  |  |  |
| Solvent | Organic solvent A | 5.00 | 5.00 | 5.00 | 5.00 | 5.00 |
|  | Organic solvent B | 18.00 | 18.00 | 18.00 | 18.00 | 18.00 |
|  | Organic solvent E | 16.00 | 16.00 | 16.00 | 16.00 | 16.00 |
|  | Organic solvent G |  |  |  |  |  |
| Resin | Resin particle B | 2.50 | 2.50 | 2.50 | 2.50 | 2.50 |
| Lubricant | Polyethylene wax |  |  |  |  | 1.00 |
|  | Carnauba wax |  |  |  |  |  |
|  | Polydimethylsiloxane compound |  |  |  |  |  |
| Surfactant | Surfactant | 1.00 | 1.00 | 1.00 | 1.00 | 1.00 |
| Defoaming agent | Defoaming agent | 0.50 | 0.50 | 0.50 | 0.50 | 0.50 |
| Antibacterial Agent | Antibacterial Agent | 0.10 | 0.10 | 0.10 | 0.10 | 0.10 |
| pH regulator | pH regulator | 0.50 | 0.50 | 0.50 | 0.50 | 0.50 |
| Water | Deionized water | 53.40 | 51.40 | 36.40 | 31.40 | 45.40 |
|  | Total | 100.00 | 100.00 | 100.00 | 100.00 | 100.00 |
| Evaluation | Y/X ratio of white ink | 6.0 | 6.0 | 6.0 | 6.0 | 6.0 |
|  | Addition amount of Hollow particle [%] | 3.0 | 5.0 | 20.0 | 25.0 | 10.0 |
|  | Sedimentation property of white ink [%] | −0.5 | −0.6 | −1.3 | −1.9 | −0.8 |
|  | Addition of lubricant [%] | 0.0 | 0.0 | 0.0 | 0.0 | 1.0 |
|  | Lightness of solid white area (dryness) | 42.3 | 55.7 | 85.4 | 89.1 | 75.0 |
|  | Storage stability of white ink | +0.3 | +0.5 | +3.1 | +5.0 | +4.9 |
|  | Mixing SP value of organic solvent | 13.3 | 13.3 | 13.3 | 13.3 | 13.3 |

TABLE 1-continued $(cal/cm^3)^{0.5}$

|  |  | W-11 | W-12 | W-13 | W-14 |
|---|---|---|---|---|---|
| Hollow particle | Hollow particle A |  |  |  |  |
|  | Hollow particle B |  |  |  |  |
|  | Hollow particle C |  |  | 10.00 | 10.00 |
|  | Hollow particle D | 10.00 | 10.00 |  |  |
|  | Hollow particle E |  |  |  |  |
| Solvent | Organic solvent A | 5.00 | 5.00 |  | 15.00 |
|  | Organic solvent B | 18.00 | 18.00 | 6.00 | 24.00 |
|  | Organic solvent E | 16.00 | 16.00 | 33.00 |  |
|  | Organic solvent G |  |  |  |  |
| Resin | Resin particle B | 2.50 | 2.50 | 2.50 | 2.50 |
| Lubricant | Polyethylene wax |  |  |  |  |
|  | Carnauba wax | 1.00 |  |  |  |
|  | Polydimethylsiloxane compound |  | 1.00 |  |  |
| Surfactant | Surfactant | 1.00 | 1.00 | 1.00 | 1.00 |
| Defoaming agent | Defoaming agent | 0.50 | 0.50 | 0.50 | 0.50 |
| Antibacterial Agent | Antibacterial Agent | 0.10 | 0.10 | 0.10 | 0.10 |
| pH regulator | pH regulator | 0.50 | 0.50 | 0.50 | 0.50 |
| Water | Deionized water | 45.40 | 45.40 | 46.40 | 46.40 |
|  | Total | 100.00 | 100.00 | 100.00 | 100.00 |
| Evaluation | Y/X ratio of white ink | 6.0 | 6.0 | 4.5 | 4.5 |
|  | Addition amount of Hollow particle [%] | 10.0 | 10.0 | 10.0 | 10.0 |
|  | Sedimentation property of white ink [%] | −0.7 | −0.6 | −0.8 | −0.8 |
|  | Addition of lubricant [%] | 1.0 | 1.0 | 0.0 | 0.0 |
|  | Lightness of solid white area (dryness) | 74.7 | 73.9 | 70.1 | 73.5 |
|  | Storage stability of white ink | +3.6 | +0.5 | +3.8 | +0.5 |
|  | Mixing SP value of organic solvent $(cal/cm^3)^{0.5}$ | 13.3 | 13.3 | 11.5 | 15.5 |

TABLE 2

|  |  | C-01 | C-02 | C-03 | C-04 | C-05 |
|---|---|---|---|---|---|---|
| Coloring material | Black dispersion |  |  |  |  |  |
|  | Cyan dispersion | 31.25 | 31.25 | 31.25 | 31.25 | 31.25 |
|  | Magenta dispersion |  |  |  |  |  |
|  | Yellow dispersion |  |  |  |  |  |
| Solvent | Organic solvent A |  | 17.00 |  |  | 7.00 |
|  | Organic solvent B |  | 8.00 |  |  |  |
|  | Organic solvent C |  | 5.00 |  |  | 16.00 |
|  | Organic solvent D | 3.00 |  | 22.00 | 3.00 |  |
|  | Organic solvent E | 22.00 |  | 3.00 | 22.00 |  |
|  | Organic solvent F | 3.00 | 1.00 | 3.00 | 3.00 | 2.00 |
| Resin | Resin particle A |  |  |  |  | 7.00 |
|  | Resin particle B |  | 5.00 |  |  |  |
|  | Resin particle C | 5.00 |  | 5.00 | 5.00 | 8.00 |
| Lubricant | Polyethylene wax | 1.00 | 1.00 | 1.00 | 1.00 | 2.00 |
| Surfactant | Surfactant | 2.00 | 0.25 | 1.00 | 1.25 | 0.50 |
| Defoaming agent | Defoaming agent | 0.50 | 0.50 | 0.50 | 0.50 | 0.50 |
| Antibacterial Agent | Antibacterial Agent | 0.01 | 0.01 | 0.01 | 0.01 | 0.01 |
| pH regulator | pH regulator | 0.25 | 0.25 | 0.25 | 0.25 | 0.25 |
| Water | Deionized water | 31.99 | 30.74 | 32.99 | 32.74 | 25.49 |
|  | Total | 100.00 | 100.00 | 100.00 | 100.00 | 100.00 |
| Evaluation | 1500 ms surface tension (mN/m) | 19.5 | 32.4 | 21.7 | 20.2 | 30.0 |
|  | 15 ms surface tension/1500 ms surface tension | 1.53 | 1.17 | 1.43 | 1.49 | 1.25 |

TABLE 2-continued

| | | | | | | |
|---|---|---|---|---|---|---|
| | Mixing SP value of organic solvent (cal/cm³)^0.5 | 11.1 | 15.7 | 11.9 | 11.1 | 14.1 |
| | Mixing SP value of resin (cal/cm³)^0.5 | 7.5 | 10.0 | 7.5 | 7.5 | 9.4 |
| | Discharge stability (number of non-discharging nozzles) | 5 | 0 | 0 | 0 | 0 |

| | | C-06 | C-07 | C-08 | C-09 | C-10 |
|---|---|---|---|---|---|---|
| Coloring material | Black dispersion | | | | | |
| | Cyan dispersion | 31.25 | 31.25 | 31.25 | 31.25 | 31.25 |
| | Magenta dispersion | | | | | |
| | Yellow dispersion | | | | | |
| Solvent | Organic solvent A | 17.00 | | 15.00 | | |
| | Organic solvent B | 8.00 | | 10.00 | | |
| | Organic solvent C | 5.00 | | 5.00 | | |
| | Organic solvent D | | 14.00 | | 22.00 | 22.00 |
| | Organic solvent E | | 11.00 | | 3.00 | 3.00 |
| | Organic solvent F | 1.00 | 3.00 | 1.00 | 3.00 | 3.00 |
| Resin | Resin particle A | | | | | |
| | Resin particle B | 5.00 | | 5.00 | | 5.00 |
| | Resin particle C | | 5.00 | | 5.00 | |
| Lubricant | Polyethylene wax | 1.00 | 1.00 | 1.00 | | |
| Surfactant | Surfactant | 0.75 | 1.00 | 1.00 | 1.00 | 1.00 |
| Defoaming agent | Defoaming agent | 0.50 | 0.50 | 0.50 | 0.50 | 0.50 |
| Antibacterial Agent | Antibacterial Agent | 0.01 | 0.01 | 0.01 | 0.01 | 0.01 |
| pH regulator | pH regulator | 0.25 | 0.25 | 0.25 | 0.25 | 0.25 |
| Water | Deionized water | 30.24 | 32.99 | 29.99 | 33.99 | 33.99 |
| | Total | 100.00 | 100.00 | 100.00 | 100.00 | 100.00 |
| Evaluation | 1500 ms surface tension (mN/m) | 29.9 | 21.7 | 25.8 | 20.8 | 22.8 |
| | 15 ms surface tension/1500 ms surface tension | 1.21 | 1.43 | 1.33 | 1.45 | 1.41 |
| | Mixing SP value of organic solvent (cal/cm³)^0.5 | 15.7 | 11.5 | 15.5 | 11.9 | 11.9 |
| | Mixing SP value of resin (cal/cm³)^0.5 | 10.0 | 7.5 | 10.0 | 7.5 | 10.0 |
| | Discharge stability (number of non-discharging nozzles) | 0 | 0 | 0 | 1 | 0 |

| | | C-11 | K-01 | M-01 | Y-01 | Clear-01 |
|---|---|---|---|---|---|---|
| Coloring material | Black dispersion | | 31.25 | | | |
| | Cyan dispersion | 31.25 | | | | |
| | Magenta dispersion | | | 31.25 | | |
| | Yellow dispersion | | | | 31.25 | |
| Solvent | Organic solvent A | | | | | 7.00 |
| | Organic solvent B | | | | | |
| | Organic solvent C | | | | | 16.00 |
| | Organic solvent D | 22.00 | 22.00 | 22.00 | 22.00 | |
| | Organic solvent E | 3.00 | 3.00 | 3.00 | 3.00 | |
| | Organic solvent F | 3.00 | 3.00 | 3.00 | 3.00 | 2.00 |
| Resin | Resin particle A | 4.00 | | | | 7.00 |
| | Resin particle B | 1.00 | | | | |
| | Resin particle C | | 5.00 | 5.00 | 5.00 | 8.00 |
| Lubricant | Polyethylene wax | | 1.00 | 1.00 | 1.00 | 2.00 |
| Surfactant | Surfactant | 1.00 | 1.00 | 1.00 | 1.00 | 0.50 |
| Defoaming agent | Defoaming agent | 0.50 | 0.50 | 0.50 | 0.50 | 0.50 |
| Antibacterial Agent | Antibacterial Agent | 0.01 | 0.01 | 0.01 | 0.01 | 0.01 |
| pH regulator | pH regulator | 0.25 | 0.25 | 0.25 | 0.25 | 0.25 |
| Water | Deionized water | 33.99 | 32.99 | 32.99 | 32.99 | 56.74 |
| | Total | 100.00 | 100.00 | 100.00 | 100.00 | 100.00 |
| Evaluation | 1500 ms surface tension (mN/m) | 22.2 | 21.9 | 22.3 | 22.5 | 29.7 |
| | 15 ms surface tension/1500 ms surface tension | 1.42 | 1.43 | 1.42 | 1.41 | 1.29 |

TABLE 2-continued

| | | | | | |
|---|---|---|---|---|---|
| Mixing SP value of organic solvent $(cal/cm^3)^{0.5}$ | 11.9 | 11.9 | 11.9 | 11.9 | 14.1 |
| Mixing SP value of resin $(cal/cm^3)^{0.5}$ | 11.3 | 7.5 | 7.5 | 7.5 | 9.4 |
| Discharge stability (number of non-discharging nozzles) | 0 | 0 | 0 | 0 | 0 |

The hollow particles, the organic solvent, the resin particles, the lubricant, the surfactant, the defoaming agent, the antibacterial agent, the pH regulator, and the evaluation method shown in Tables 1 and 2 are as follows.

Hollow Particle

Hollow particle A (ROPAQUE ULTRA E: Y/X=1.5, average particle diameter=400 nm, manufactured by Dow Chemical Co.)

Hollow particles B (* obtained by the above synthesis method: Y/X=3.0, average particle size=600 nm)

Hollow particles C (* obtained by the above synthesis method: Y/X=4.5, average particle size=600 nm)

Hollow particles D (* obtained by the above synthesis method: Y/X=6.0, average particle size=400 nm)

Hollow particles E (SX 868, Y/X=9.3, average particle diameter=600 nm, manufactured by JSR Corporation)

Organic Solvent

Organic solvent A (glycerin, SP value=17.4 $(cal/cm^3)^{0.5}$, manufactured by Sakamoto Yakuhin Co., Ltd.)

Organic solvent B (1,2-propanediol, SP value=14.3 $(cal/cm^3)^{0.5}$, manufactured by Tokyo Chemical Industry Co., Ltd.)

Organic solvent C (1,2-butanediol, SP value=13.1 $(cal/cm^3)^{0.5}$, manufactured by Tokyo Chemical Industry Co., Ltd.)

Organic solvent D (3-methyl-1,3-butanediol, SP value=12.1 $(cal/cm^3)^{0.5}$, manufactured by Tokyo Chemical Industry Co., Ltd.)

Organic solvent E (3-ethyl-3-hydroxymethyloxetane, SP value=11.0 $(cal/cm^3)^{0.5}$, manufactured by Tokyo Chemical Industry Co., Ltd.)

Organic solvent F (2-ethyl-1,3-hexanediol, SP value=10.9 $(cal/cm^3)^{0.5}$, manufactured by Tokyo Chemical Industry Co., Ltd.)

Organic solvent G (3-methoxy-N, N-dimethylpropoxyamide, SP value=9.2 $(cal/cm^3)^{0.5}$, manufactured by Idemitsu Kosan Co., Ltd.)

Resin Particle

Resin particle A (Superflex 420, SP value=11.6 $(cal/cm^3)^{0.5}$, manufactured by DKS Co. Ltd.)

Resin particle B (RKP-02, SP value=10.0 $(cal/cm^3)^{0.5}$, manufactured by Toyo Chem KK.) Resin particle C (KP-543, SP value=7.5 $(cal/cm^3)^{0.5}$, manufactured by Shin-Etsu Silicone Co., Ltd.)

Lubricant

Polyethylene wax (AQUACER-539, manufactured by BYK Co.)

Carnauba wax (Selosol 524, manufactured by Chukyo Yushi Co., Ltd.)

Polydimethylsiloxane compound (BYK 333, manufactured by BYK Co.)

Surfactant

KF-640, manufactured by Shin-Etsu Silicone Co. Ltd.

Defoaming Agent

KM-72F, manufactured by Shin-Etsu Silicone Co., Ltd.

Antibacterial Agent

LV(S) manufactured by Avecia Ltd.

pH Regulator 2-amino-2-ethyl-1,3-propanediol, manufactured by Tokyo Chemical Industry Co., Ltd.

Measurement of Y/X of White Ink

Two grams of the white ink obtained as specified above was weighed into a flat petri dish having an inner diameter of 33 mm and dried for 60 seconds in a thermostatic chamber (PR-3J manufactured by ESPEC Co., Ltd.) set at 90 degrees C. Thereafter, the maximum value X in the absorption band from 1590 to 1610 cm$^{-1}$ and the maximum value Y in the absorption band from 1720 to 1740 cm$^{-1}$ were measured using the FT-IR measuring device (iN10 MX/iZ10, manufactured by Thermo Fisher Scientific K.K.) and analysis software (OMNIC). The ratio of the maximum value (Y/X) was also obtained.

Measurement of Sedimentation Property of White Ink

The sedimentation property of the hollow particles in the white ink was measured as follows using a sedimentation property measuring device (Turbi Science Classic MA 2000, manufactured by EKOKO SEIKI Co., Ltd.).

The white ink was subjected to ultrasonic treatment (100 W, 40 minutes) using an ultrasonic cleaner (US-3, manufactured by AS ONE Corporation) to make it homogeneous, and thereafter 5.5 mL of each ink was loaded into a glass tube dedicated to the cleaner with a pipette.

The ink was measured 30 minutes after the liquid level of the ink in the glass tube was stabilized. This point in time was determined as the start of sedimentation evaluation. Thereafter, the ink was left still at 25 degrees C. and kept measured for 168 hours. Sedimentation was checked and indicated by deviation using the start of sedimentation evaluation as reference. The sedimentation property was checked based on the average value (percent) of the supernatant relative change percentage after the white ink was left still at 25 degrees C. for 168 hours in the integration (from 20 mm above the bottom of the sample tube to the liquid level) of the backscattered light intensity peak due to sedimentation of the hollow particles in the white ink. Incidentally, practically usable level is −2.0% or more regarding sedimentation property.

Measurement of Lightness (After Drying) of White Solid Portion

The white ink shown in Table 1 was discharged to a recording medium (Lumina Color Black, 128 gsm, manufactured by Oji FTex Co., Ltd.) using a liquid discharging device (IPSiO GXe 5500, manufactured by Ricoh Company, Ltd.) at a print resolution of 1200 dpi×1200 dpi and an ink attachment amount of 2 mg/cm$^2$. Thereafter, the white ink was dried in a thermostatic chamber (PR-3J, manufactured by ESPEC Co., Ltd.) set at 90 degrees C. for 60 seconds and measured to obtain lightness of a print sample of the dried white solid portion.

The print chart used was a solid image of 3 cm square formed with dot patterns.

The lightness of the printed sample was measured with a spectrophotometer (939 manufactured by X-Rire Co.).

Measurement of Storage Stability of White Ink

Viscosity of the white ink stored under the following conditions was measured before and after the storage with a viscometer (RE-85L, manufactured by Toki Sangyo Co., Ltd.), and the viscosity change rate was calculated. Practically usable viscosity change rate is within the initial viscosity of from −5.0 to 5.0 percent.

Storage conditions: rested still for 14 days in a thermostatic chamber (PR-3J manufactured by ESPEC Co., Ltd.) set at 70 degrees C. Measuring temperature: 25 degrees C.

Method of Measuring Surface Tension of Non-White Ink

With respect to the non-white ink shown in Table 2, the surface tension at a bubble lifetime of 15 ms and the surface tension at a bubble lifetime of 1500 ms were measured at 25 degrees C. using a dynamic surface tensiometer DynoTester (manufactured by SITA Messtechnik).

Also, the ratio of the value of the surface tension at a bubble lifetime of 15 ms to the value of the surface tension at a bubble life time of 1500 ms was calculated. In Table 2, it is written as (15 ms surface tension/1500 ms surface tension).

Measurement of Discharging Stability of Non-White Ink

The non-white ink shown in Table 2 was discharged to form a solid image of 10 cm square with a run length of 100 prints at a print resolution of 1200 dpi×1200 dpi and an ink attachment amount of 1 mg/cm$^2$ using a liquid discharging device (IPSiO GXe 5500, manufactured by Ricoh Company, Ltd.). Thereafter, the number of non-discharging nozzles was visually counted. Note that if the number of non-discharging nozzles is one channel or less, it is determined as practically usable.

Measurement of Mixing SP Value of Organic Solvents

The mixing SP value of the organic solvents contained in the ink was calculated based on the following relation. The total volume of the organic solvents in the ink was set to 1, and the volume fraction and the SP value of each solvent were calculated.

Mixing SP value (cal/cm$^3$)$^{0.5}$ of organic solvents in ink=[SP value of organic solvent $A$×volume fraction of organic solvent $A$]+ . . . +[SP value of organic solvent $Z$×volume fraction of organic solvent $Z$]

In addition, although the organic solvent for use in the present disclosure includes articles classified as permeating agents, defoaming agents, etc. in terms of functionality, only the organic solvents accounting for 3 percent by mass or more of the ink were counted for the above-mentioned calculation of the SP.

Measurement of Mixing SP Value of Resin

The mixing SP value of the resin contained in the ink was calculated based on the following relation. The total volume of the resin in the ink was set to 1, and the volume fraction and the SP value of each resin were calculated.

Mixing SP (cal/cm$^3$)$^{0.5}$ value of resin in ink=[SP value of resin $A$×volume fraction of resin $A$]+ . . . +[SP value of resin $Z$×volume fraction of resin $Z$]

In addition, the mixing SP value was calculated only for the resins accounting for 1 percent by mass or more of the entire of the ink in the present disclosure.

The white ink and the non-white ink were used in the combination shown in Table 3, and the following evaluations were made.

The results are shown in Table 3.

Printing Method

In Examples 1 to 17, 19 to 25, and Comparative Examples 1 to 6, a liquid discharging device (IPSiO GXe5500, manufactured by Ricoh Company, Ltd.) not having a circulation type discharging head was used, and the white ink shown in Table 3 was discharged to a recording medium (Lumina color black, 128 gsm, manufactured by Oji F-Techs Co., Ltd.) at a print resolution of 1200 dpi×1200 dpi and an ink attachment amount of 2 mg/cm$^2$, and thereafter dried in a thermostatic chamber (PR-3J, manufactured by ESPEC Co., Ltd.) at 90 degrees C. for 60 seconds to obtain a print sample. The print chart used was a solid image of 3 cm square formed with dot patterns.

Thereafter, the non-white ink shown in Table 3 was discharged onto the solid image of the white ink formed with the dot patterns specified above using a liquid discharging device (IPSiO GXe 5500, manufactured by Ricoh Company, Ltd.) at a printing resolution of 1200 dpi×1200 dpi, ink attachment amount of 1 mg/cm$^2$. It was dried in a thermostatic chamber (PR-3J, manufactured by ESPEC Co., Ltd.) set at 90 degrees C. for 60 seconds to prepare a print sample. The print chart used was a solid image of 3 cm square formed with dot patterns.

In Example 18 in which "Yes" was written in the column of "presence/absence of circulation type discharging head" shown in Table 3, the white ink and the non-white ink were discharged in the same manner except that the liquid discharging head using the circulation type discharging head illustrated in FIG. 9 was used.

Measuring of Color Tone of Non-White Ink on White Ink Portion

According to the following procedure, the color tone of the non-white ink printed on the printed white ink was measured.

L*a*b* of the non-white ink image printed on the printed white ink was measured by a spectrophotometer (939, manufactured by X-Rite) to calculate the value according to the relation of $(L^{*2}+a^{*2}+b^{*2})$. Note that when the calculated value is 0 or more for black ink, 50 or more for cyan ink, 70 or more for magenta ink, 100 or more for yellow ink, 80 or more for green ink (combination of cyan ink and yellow ink), the non-white colors are practically usable.

L* represents lightness, a* represents reddish and greenish color, and b* represents yellowish and bluish color.

Measurement of Contact Angle of Non-White Ink when Non-White Ink Dripped onto White Ink and Diameter of Dot of Non-White Ink 1 μL of a non-white ink was dripped onto a solid image of 3 cm square formed with a white ink and the contact angle thereof was measured by the method described in "Printing Method", using a portable contact angle meter (PCA-11, manufactured by KYOWA Co.). The contact angle was measured at 25 degrees C.

Furthermore, the sample was dried in a thermostatic chamber (PR-3J, manufactured by ESPEC Co., Ltd.) set at 90 degrees C. for 60 seconds, and the diameter of the dot of the dripped non-white ink was measured using a digital microscope (digital microscope, manufactured by KEYENCE Corporation). Note that the dot diameter is preferably in the range of from 2,800 to 3,150 μm.

Evaluation of Fixability

A sample on which a non-white ink was printed on a white ink image by the method described in "Printing Method" was abraded by a clock meter (manufactured by DAIEI KAGAKU SEIKI MFG. co., ltd.) having a load of 9 N equipped with cotton cloth (TexTile Innovators, manufactured by SDL ATLAS) back and forth five times, and the concentration of the ink transferred to the cotton cloth was measured with a spectrophotometer (939 manufactured by X-Rite Co., Ltd.). If the measured ink concentration is 0.10 or less, fixability is practically usable.

TABLE 3

| No. | White ink prescription White | Non-white ink prescription Black | Cyan | Magenta | Yellow | Clear-01 | Presence/absence of circulation type discharging head |
|---|---|---|---|---|---|---|---|
| Comparative Example 1 | W-01 | | C-01 | | | | None |
| Comparative Example 2 | W-01 | | C-02 | | | | None |
| Comparative Example 3 | W-02 | | C-03 | | | | None |
| Comparative Example 4 | W-03 | | C-03 | | | | None |
| Comparative Example 5 | W-06 | | C-03 | | | | None |
| Example 1 | W-04 | | C-03 | | | | None |
| Example 2 | W-05 | | C-03 | | | | None |
| Example 3 | W-01 | | C-03 | | | | None |
| Example 4 | W-01 | | C-04 | | | | None |
| Example 5 | W-01 | | C-05 | | | | None |
| Example 6 | W-01 | | C-06 | | | | None |
| Example 7 | W-01 | | C-07 | | | | None |
| Example 8 | W-01 | | C-08 | | | | None |
| Example 9 | W-01 | | C-09 | | | | None |
| Example 10 | W-01 | | C-10 | | | | None |
| Example 11 | W-01 | | C-11 | | | | None |
| Example 12 | W-07 | | C-03 | | | | None |
| Example 13 | W-08 | | C-03 | | | | None |
| Example 14 | W-09 | | C-03 | | | | None |
| Example 15 | W-10 | | C-03 | | | | None |
| Example 16 | W-11 | | C-03 | | | | None |
| Example 17 | W-12 | | C-03 | | | | None |
| Example 18 | W-01 | | C-03 | | | | Yes |
| Example 19 | W-01 | K-01 | | | | | None |
| Example 20 | W-01 | | | M-01 | | | None |
| Example 21 | W-01 | | | | Y-01 | | None |
| Example 22 | W-01 | | | | | Clear-01 | None |
| Example 23 | W-01 | | C-03 | | Y-01 | | None |
| Comparative Example 6 | W-01 | — | C-01 | | Y-01 | | None |
| Example 24 | W-13 | | C-03 | | | | None |
| Example 25 | W-14 | | C-03 | | | | None |

| No. | Color tone of non-white ink on white ink portion | Contact angle of non-white ink to white ink portion [°] | Dot diameter of non-white ink to white ink portion [μm] | Fixability of non-white ink to white ink portion |
|---|---|---|---|---|
| Comparative Example 1 | 23.8 | 14.1 | 3176 | Not measurable due to white ink transparency |
| Comparative Example 2 | 82.1 | 34.6 | 2712 | 0.21 |
| Comparative Example 3 | 33.3 | 17.7 | 3110 | Not measurable due to white ink transparency |
| Comparative Example 4 | 47.8 | 19.8 | 3072 | 0.05 |
| Comparative Example 5 | 46.6 | 19.3 | 3079 | 0.06 |
| Example 1 | 75.1 | 18.0 | 3104 | 0.04 |
| Example 2 | 74.5 | 18.3 | 3099 | 0.03 |
| Example 3 | 73.8 | 18.7 | 3091 | 0.04 |
| Example 4 | 50.1 | 14.9 | 3134 | 0.02 |
| Example 5 | 80.2 | 30.0 | 2886 | 0.08 |
| Example 6 | 81.1 | 30.9 | 2870 | 0.10 |
| Example 7 | 71.2 | 18.7 | 3093 | 0.03 |
| Example 8 | 78.1 | 24.8 | 2981 | 0.08 |
| Example 9 | 59.9 | 17.3 | 3117 | 0.03 |
| Example 10 | 75.5 | 20.3 | 3063 | 0.08 |
| Example 11 | 76.4 | 19.4 | 3079 | 0.10 |
| Example 12 | 58.2 | 19.0 | 3081 | 0.04 |
| Example 13 | 80.0 | 18.3 | 3099 | 0.03 |
| Example 14 | 83.2 | 18.0 | 3104 | 0.03 |
| Example 15 | 75.6 | 19.1 | 3084 | 0.06 |
| Example 16 | 76.9 | 18.8 | 3090 | 0.07 |

TABLE 3-continued

| | | | | |
|---|---|---|---|---|
| Example 17 | 74.3 | 19.3 | 3081 | 0.07 |
| Example 18 | 73.8 | 18.7 | 3092 | 0.04 |
| Example 19 | 2.5 | 19.0 | 3086 | 0.02 |
| Example 20 | 82.9 | 19.6 | 3076 | 0.07 |
| Example 21 | 139.8 | 19.8 | 3071 | 0.05 |
| Example 22 | Unable to measure (clear ink) | 29.1 | 2886 | Unable to measure (clear ink) |
| Example 23 | 87.5 | 20.0 | 3067 | 0.05 |
| Comparative Example 6 | 80.3 | 17.0 | 3155 | 0.09 |
| Example 24 | 77.3 | 28.3 | 2917 | 0.05 |
| Example 25 | 81.3 | 31.1 | 2865 | 0.10 |

Discharging Reliability

In the printing method described above, discharging reliability of the white ink W-01 of Example 3 using the liquid discharging device (IPSiO GXe 5500, manufactured by Ricoh Company, Ltd.) without a circulation type discharging head and the white ink W-01 of Example 18 using the liquid discharging device (remodeled IPSiO GXe 5500, manufactured by Ricoh Company Ltd.) carrying the circulation type discharging head illustrated in FIG. 9 was evaluated.

In Example 18 in which the liquid discharging device (remodeled IPSiO GXe 5500, manufactured by Ricoh Co., Ltd.) carrying a circulation device illustrated in FIG. 9 was used, the liquid discharging device was filled with the ink W-01 and ink circulation was stopped for 30 minutes. Thereafter, a step of applying a stimulation to the ink with a strength not allowing the ink to be discharged while circulating the ink was provided before printing while circulating the ink.

A nozzle check pattern was printed on a recording medium (Lumina Color Black, 128 gsm, manufactured by Oji F-Techs Co., Ltd.), and the number of discharging nozzles from which the ink was discharged was checked for all the number of nozzles of 384 and evaluated according to the following criteria.

B and above in the evaluation are preferable in terms of practical use.

The results are shown in Table 4.

Evaluation Criteria

A: Number of discharging nozzles is 384

B: Number of discharging nozzles is from 368 to less than 384

C: Number of discharging nozzles is from 192 to less than 368

D: Number of discharging nozzles is less than 192

TABLE 4

| | White Ink | Circulation head (circulation device) | Discharging reliability |
|---|---|---|---|
| Example 3 | W-01 | None | B |
| Example 18 | W-01 | Yes | A |

Due to the ink set of the white ink and the non-white ink of the present disclosure, even when the white ink contacts the non-white ink, images good for filling solid portions are obtained which have white solid image portions having a high lightness and in which wettability of the non-white ink to the white ink is secured.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink set comprising:

a white ink comprising a hollow particle accounting for 5.0 to 25.0 percent by mass of the white ink; and a non-white ink, wherein, in an infrared spectrum for a dried film of the white ink, a ratio (Y/X) of a maximum value Y in an absorption band of from 1720 to 1740 $cm^{-1}$ to a maximum value X in an absorption band of from 1590 to 1610 $cm^{-1}$, is from 3.0 to 6.0, wherein the non-white ink has a surface tension of from 20.0 to 30.0 mN/m at a bubble lifetime of 1500 ms, at a temperature of 25 degrees C.

2. The ink set according to claim 1, wherein an average of a supernatant relative change amount percentage in an integration of backscattered light intensity peaks of the white ink is −2.0 percent or more as measured by Turbi Scan Classic MA 2000, manufactured by EKO Seiki Co., Ltd., after the white ink is stored at 25 degrees C. for 168 hours.

3. The ink set according to claim 1, wherein the white ink further comprises polyethylene wax, carnauba wax, or a polydimethylsiloxane compound.

4. The ink set according to claim 1, wherein a contact angle of the non-white ink to the dried film of the white ink based on a drop method is from 15.0° to 30.0°.

5. The ink set according to claim 1, wherein a ratio (A/B) of a surface tension value A of the non-white ink at a bubble lifetime of 15 ms to a surface tension value B of the non-white ink at a bubble lifetime of 1500 ms is from 1.20 to 1.50.

6. The ink set according to claim 1, wherein the non-white ink comprises an organic solvent having a mixing SP value of from 11.5 to 15.5 $[cal/cm^3]^{0.5}$.

7. The ink set according to claim 1, wherein the non-white ink comprises a resin having a mixing SP value of from 7.5 to 10.0 $[cal/cm^3]^{0.5}$.

8. The ink set according to claim 1, wherein the hollow particle comprises a copolymer which comprises a structure unit represented by formula (1) and a structure unit represented by formula (2):

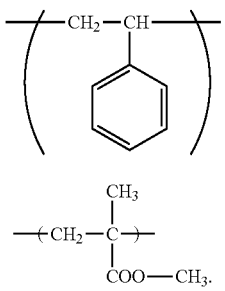 formula (1)

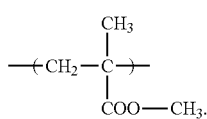 formula (2)

9. A white ink comprising:
a hollow particle accounting for 5.0 to 25.0 percent by mass of the white ink,
wherein, in an infrared spectrum for a dried film of the white ink, a ratio (Y/X) of a maximum value Y in an absorption band of from 1720 to 1740 $cm^{-1}$ to a maximum value X in an absorption band of from 1590 to 1610 $cm^{-1}$, is from 3.0 to 6.0.

10. The white ink according to claim 9,
wherein an average of a supernatant relative change amount percentage in an integration of backscattered light intensity peaks of the white ink is −2.0 percent or more as measured by Turbi Scan Classic MA 2000, manufactured by EKO Seiki Co., Ltd., after the white ink is stored at 25 degrees C. for 168 hours.

11. The white ink according to claim 9, further comprising polyethylene wax, carnauba wax, or a polydimethylsiloxane compound.

12. A recording method comprising:
applying the white ink of the ink set of claim 1 to a recording medium; and
applying the non-white ink of the ink set to the recording medium.

13. The recording method according to claim 12,
wherein the non-white ink is applied after the white ink is applied.

14. The recording method according to claim 12, further comprising drying the white ink after applying the white ink.

15. An ink discharging device comprising:
the ink set of claim 1; and
an ink discharging head comprising a nozzle, configured to discharge the white ink and the non-white ink of the ink set.

16. The ink discharging device according to claim 15,
wherein the ink discharging head further comprises a plurality of individual liquid chambers communicating with the nozzle, an inflow channel configured to allow the ink to flow into the individual liquid chambers, and an outflow channel configured to allow the ink to flow out of the individual liquid chambers,
wherein the ink discharging device further comprises a circulation channel configured to circulate the ink out of the outflow channel into the inflow channel, and a negative pressure generating device configured to generate a negative pressure to allow the ink to flow out of individual liquid chambers.

* * * * *